(12) United States Patent
Radev

(10) Patent No.: US 7,466,053 B1
(45) Date of Patent: Dec. 16, 2008

(54) DUAL-ROTOR ELECTRIC TRACTION MOTOR

(76) Inventor: Vladimir Radev, 18 Chancellor Park Dr., Mays Landing, NJ (US) 08330-2049

( * ) Notice: Subject to any disclaimer, the term of this patent is extended or adjusted under 35 U.S.C. 154(b) by 0 days.

(21) Appl. No.: 12/081,040

(22) Filed: Apr. 10, 2008

(51) Int. Cl.
*H02K 16/02* (2006.01)
*H02K 9/00* (2006.01)

(52) U.S. Cl. .......................... 310/114; 310/58; 310/59; 310/61; 310/115

(58) Field of Classification Search ......... 310/112–115, 310/58–61, 265–266
See application file for complete search history.

(56) References Cited

U.S. PATENT DOCUMENTS

| | | | |
|---|---|---|---|
| 6,373,160 B1 * | 4/2002 | Schrodl | 310/114 |
| 6,794,781 B2 * | 9/2004 | Razzell et al. | 310/114 |
| 6,867,560 B2 * | 3/2005 | Arimitsu | 318/144 |
| 6,936,939 B2 * | 8/2005 | Ide et al. | 310/59 |
| 2006/0264296 A1 * | 11/2006 | Moeller | 475/275 |
| 2007/0290563 A1 * | 12/2007 | Zhao et al. | 310/114 |
| 2008/0038126 A1 * | 2/2008 | Berroth | 417/420 |

* cited by examiner

*Primary Examiner*—Tran Nguyen

(57) ABSTRACT

An inner rotor (21) is arranged as a motor field, including permanent magnets (25) embedded in an inner rotor core (24) and an inner rotor shaft (26) coupled with the inner rotor core. An outer rotor (22) is arranged as a motor armature, including a hollow armature core (36), plurality of windings (37), two side flanges (38, 39), and an outer rotor shaft (40) coupled with one of the side flanges. The inner rotor is rotatably supported inside the outer rotor, and both rotors are rotatably supported inside a stationary motor enclosure (23). Electric current is conducted to the windings of the armature via brushes (58) and sliprings (59). The interaction between a revolving electromagnetic field of the outer rotor and the permanent magnetic field of the inner rotor propels both rotors to rotate in opposite directions. Two axial fans (82, 83) integrated with the outer rotor side flanges and two axial fans (95, 96) coupled with the inner rotor shaft work in series and produce continuous internal close-loop air circulation between both rotors and between the outer rotor and the motor enclosure, for improving the rate of heat transmission from the rotors to the motor enclosure. If the outer rotor is selectively immobilized, the two inner rotor axial fans produce the internal close-loop air circulation.

20 Claims, 15 Drawing Sheets

DUAL-ROTOR ELECTRIC TRACTION MOTOR

FIELD OF THE INVENTION

This invention relates generally to electric machines having two rotors and no stator, and more particularly to dual-rotor electric traction motors.

BACKGROUND OF THE INVENTION

The conventional electric machines—motors and generators—consist of a stationary component (the stator) and a rotating component (the rotor). One of these components is arranged to operate as the field and the other—as the armature of the electric machine. When a conventional electric motor is energized and electric current flows through its windings, the interaction between the electromagnetic forces of the field and armature propels the rotor to rotate and generates mechanical energy. When the rotor of a conventional electric generator rotates, driven by external mechanical forces, a magnetic field rotating in relation to the armature windings cuts through the armature windings and produces voltage at the output terminals of the generator.

Dual-rotor electric motors, though seldom used, are well known in the art. Also known as double-rotor motor or stator-less motor, a dual-rotor motor has two rotors and no stator. In a dual-rotor motor, both rotors are supported coaxially in a stationary motor enclosure. Usually, a smaller inner rotor is supported inside a hollow larger outer rotor. Typically, the shaft of one of the rotors extends through one of the side flanges of the motor enclosure in one direction, and the shaft of the other rotor extends through the other side flanges of the motor enclosure in the opposite direction. One of the rotors of the dual-rotor motor is arranged to operate as a motor field and the other rotor is arranged to operate as a motor armature, similarly to the field and armature of a conventional motor of the same electrical kind. When a dual-rotor motor is energized and electric current flows through its windings, the interaction between the electromagnetic forces of the field and armature propels the two rotors to rotate in opposite directions and generates mechanical energy. If a dual-rotor motor is arranged to also selectively operate as an electric generator, when the two rotors of the machine rotate in opposite direction driven by external mechanical forces, a magnetic field rotating in relation to the armature windings cuts through the armature windings and produces voltage at the output terminals of the dual-rotor motor.

It shall be emphasized that the dual-rotor electric motor is the only known machine that converts another kind of energy into mechanical energy, wherein the internal action and reaction forces can be utilized for producing useful mechanical work.

In this specification, the term "traction motor" is used to designate an electric motor appropriate for vehicle propulsion. The dual-rotor traction motor may be a direct-current (DC) or an alternating-current (AC) electrical machine of various types and designs. The control and protection of a dual-rotor electric traction motor, including directional control, torque-speed output control, over-speed protection of the rotors, thermal protection of the motor, selective operation of the motor as a generator, etc., are generally arranged in the same way and by the same means as in a conventional traction motor of the same electrical kind.

A remarkable feature of the dual-rotor motor is that the torques on the shafts of both rotors always have equal magnitudes and opposite directions, because the rotors are propelled to rotate in opposite directions by the same electromagnetic forces (action and reaction). The two rotors, however, may rotate with different absolute rotational speeds (the speeds in relation to a stationary body, such as the motor enclosure), depending on the external mechanical loads upon each of the rotors.

Another remarkable feature of the dual-rotor motor is that the total torque on the shafts of both rotors, i.e., the sum of the torques of both rotors, is two times greater than the torque on the shaft of an otherwise equivalent conventional motor operating under the same electrical parameters at the same power output. At the same time, the sum of the absolute rotational speeds of both rotors of the dual-rotor motor is equal to the speed of the rotor of the equivalent conventional motor. Said differently, at the same power output, the dual-rotor motor generates two times greater total output torque at a much lower speed of each rotor than the output torque and speed of the rotor of an equivalent conventional motor. Here, the term "equivalent conventional motor" is used to designate a conventional motor of the same electrical kind, having the same size and design of the active electrical components (field and armature), the same power output, and the same electric control as those of the dual-rotor motor. If the outer rotor of a dual-rotor motor is somehow mechanically immobilized, then the dual-rotor motor will operate exactly as an "equivalent conventional motor" as far as the torque-speed output of the motor is concerned.

Usually, the direction of rotation of the rotor of a conventional traction motor is reversible, for selectively producing a backward motion of the vehicle. For the same reason and in the same way, the opposite directions of rotation of the two rotors of a dual-rotor traction motor are reversible.

Most of the contemporary conventional traction motors used in electric or hybrid-electric vehicles are arranged to selectively operate as electric braking generators, for converting part of the kinetic energy of the vehicle into electric energy during speed retardation or braking of the vehicle. Thus, the conventional traction motors provide electric braking with recovery of energy. The dual-rotor traction motor may likewise be arranged to selectively operate as an electric braking generator, generally in the same way and by the same means as a conventional traction motor of the same electrical kind.

The above described unique features make the dual-rotor motors very attractive for applications as traction motors in steerable four-wheeled electric or hybrid-electric vehicles.

When a dual-rotor traction motor is incorporated in a two-wheel-drive system, the two rotors drive the two wheels of a drive axle respectively via two mechanically independent drive trains having the same speed reduction ratios. The two drive trains are arranged to provide the same directions of rotations of the two wheels of the drive axle at opposite directions of rotation of both rotors. In such an arrangement, the dual-rotor motor produces substantially equal tractive forces on both driving wheels, while allowing different rotational speeds of the wheels during a turn of the vehicle. Therefore, a two-wheel-drive system with a dual-rotor traction motor does not require an axle differential. Further, because at the same power output, the total torque of the two rotors is two times greater and the rotational speed of each rotor is two times lower than those of an equivalent conventional motor, the speed reduction ratios between each rotor and the respective wheel is two times smaller than the speed reduction ratio of a drive train using an equivalent conventional traction motor. The result of the described above advantages is a simple, compact, and highly efficient two-wheel-drive system, superior to a drive system with an equivalent conventional traction motor.

When a dual-rotor traction motor is incorporated in a four-wheel-drive system, the two rotors drive the wheels of two drive axles respectively via two mechanically independent drive trains, each one including the final drive and differential of the respective drive axle. The two drive trains may have the same or different speed reduction ratios and are arranged to provide the same direction of rotation of the four wheels of the vehicle at the opposite directions of rotations of both rotors. At the same reduction ratios of both drive trains and the same rolling radiuses of all four wheels, the system provides substantially equal tractive forces on the four driving wheels, while allowing different rotational speeds of the wheels during a turn of the vehicle. At different speed reduction ratios of the drive trains, the system provides tractive forces on the front and rear wheels of the vehicle in the same proportion as the proportion between the speed reduction ratios of the respective drive trains, while allowing different rotational speeds of all driving wheels during a turn of the vehicle. In both cases, however, a four-wheel-drive system does not require an inter-axle (center) differential. In addition, because at the same power output, the total torque of the two rotors is two times greater and the rotational speed of each rotor is much lower than those of an equivalent conventional motor, the speed reduction ratios between each rotor and the wheels of the respective axle is much smaller than the speed reduction ratio of a drive train using an equivalent conventional traction motor. The result of the described above advantages is a simple, compact, and highly efficient four-wheel-drive system, superior to a drive system with an equivalent conventional motor.

In a four-wheel-drive system, when the dual-rotor motor operates as an electric braking generator during speed retardation and braking of the vehicle, the proportion between the electric braking forces on the front and rear wheels is the same as the proportion between the speed reduction ratios of the drive trains from the rotors to the front and rear wheels respectively. If this proportion is selected properly, the dual-rotor motor provides a very safe four-wheel electric braking of the vehicle.

Another advantage of the dual-rotor motor is that, in principle, the smaller inner rotor can rotate with a much higher safe speed than the safe rotational speed of the larger outer rotor. If the dual-rotor motor is incorporated into a four-wheel-drive system, the two rotors may drive the wheels of the two drive axles from standstill to a medium speed. Then, the transmission between the outer rotor and the respective axle may be interrupted via a clutch and the outer rotor may be immobilized by a brake. At this point, the dual-rotor motor continues to operate as a conventional motor, and the inner rotor continues to drive the wheels of one of the drive axles from said medium speed to the maximum speed of the vehicle. Thus, through very simple and efficient mechanics, without shifting of any gears, a drive system with a dual-rotor motor may provide a low-speed/four-wheel-drive mode and a high-speed/two-wheel-drive mode (See inventor's U.S. Pat. No. 6,005,358 Radev).

In spite of the remarkable mechanical simplicity and efficiency of the drive systems for electric and hybrid-electric vehicles using dual-rotor motors, they have not achieved wide application, due to difficulties in two major areas in the construction of the dual-rotor traction motor itself. These difficulties stem from the fact that the two major components of a dual-rotor motor—field and armature—are rotating parts.

The first major difficulty relates to the conduction of electric current from static terminals attached to the motor enclosure to the windings of the rotating outer rotor and to the windings of the rotating inner rotor of the dual-rotor motor. In the known dual-rotor motors, the electric current is conducted from stationary terminals to the windings of the outer rotor through contacts of brushes (held in brush holders attached to the motor enclosure) and sliprings (mounted on the shaft of the outer rotor). The brushes are electrically connected to the terminals of the motor and the sliprings are electrically connected to the leads of the windings of the outer rotor. The brushes are pressed to the sliprings by springs. Such an arrangement is similar to the well known in the art brushes-and-slip-rings conduction of the electric current between terminals and the windings of the rotor of the alternating-current generators. This arrangement is relatively simple and reliable.

However, the conduction of electric current from the outer router to the inner rotor is very complicated in the known dual-rotor motors. The electric current is conducted from terminals attached to the rotating outer rotor to the windings of the rotating inner rotor via very complicated and inaccessible arrangements of brushes and sliprings, or brushes and commutators. Such arrangements require complicated brush holders, capable of counteracting the centrifugal forces for maintaining a substantially constant pressure between the brushes and sliprings. In addition, access to the brush-holders and sliprings in such arrangements is very cumbersome and difficult. All that makes the manufacture and maintenance of the known dual-rotor motors difficult and expensive. Therefore, it will be very beneficial if the dual-rotor motor is arranged so that relatively simple, inexpensive, and accessible means conduct the electric current to the windings of the dual-rotor motor.

The second major difficulty relates to the cooling of the dual-rotor traction motor. The electric motors used for propulsion of steerable vehicles are fully enclosed for protection from moisture and dirt. In a conventional traction motor, the heat generated in the core of the stator is transferred to the motor enclosure mainly by direct conduction, while the heat from the rotor is transferred to the motor enclosure mainly by convection via the circulation of the air caused by the rotation of the rotor. The motor enclosure is cooled usually by an external liquid-cooling or air-cooling system. It is well known in the art that the thermal conductivity of the metals is hundreds of times greater than that of the air. Therefore, the direct conduction of the heat from the core of the stator (where most of the heat is usually generated) to the motor enclosure is a major advantage of the conventional traction motor in comparison with the dual-rotor motor, as far as the cooling of the machine is concerned, because in a dual-rotor motor such direct heat transfer through conduction is impossible.

In a dual-rotor traction motor, the heat from both rotors is transmitted to the motor enclosure mainly by convection through the air between the rotors and the motor enclosure, i.e., through a medium with low thermal conductivity. It is well known that many factors influence the rate at which heat is transferred by convection through a fluid medium between two metal surfaces. The most major of these factors, however, are the areas of the two surfaces, the temperature differences, and the velocity and character of the air flow between the two surfaces.

Therefore, it will be very beneficial if the described above disadvantages, related to the cooling of the dual-rotor traction motor, can be substantially reduced or eliminated by simple, inexpensive, and reliable means.

SUMMARY

This invention provides a dual-rotor electric traction motor with relatively simple, reliable, and easily accessible means for conducting the electric current from the stationary terminals to the rotating windings of the motor. The operation of the dual-rotor motor, according to this invention, does not require any conduction of electric current to the inner rotor of the dual-rotor motor.

The dual-rotor electric traction motor according to this invention comprises:

an outer rotor arranged as a motor armature including a hollow substantially cylindrical laminated armature core, a plurality of armature windings imbedded in a plurality of parallel inside slots of the armature core respectively, a first outer rotor side flange and a second outer rotor side flange attached coaxially to both sides of the armature core respectively and firmly tightened together with the armature core, and an outer rotor shaft firmly attached coaxially to the second outer rotor side flange and extending outside the second outer rotor side flange;

an inner rotor arranged as a motor field including a substantially cylindrical field core, a plurality of permanent magnets imbedded in a plurality of parallel outside slots of the field core respectively for producing a permanent magnetic field, and an inner rotor shaft coupled with the field core, rotatably supported coaxially inside the outer rotor, and extending outside the first outer rotor side flange;

a stationary motor enclosure including a central substantially cylindrical motor enclosure, a first motor enclosure side flange and a second motor enclosure side flange firmly attached to both sides of the central cylindrical motor enclosure respectively, wherein the inner rotor shaft is rotatably supported in the first motor enclosure side flange coaxially to the central cylindrical motor enclosure and the outer rotor shaft is rotatably supported in the second motor enclosure side flange coaxially to the central cylindrical enclosure, and an electric motor controller for operating the dual-rotor motor including control of the direction and magnitude of the electric current through the windings of the motor armature, wherein the motor controller is arranged to selectively energize the armature and via the armature to produce an electromagnetic field revolving in relation to the outer rotor, and wherein the interaction between the revolving electromagnetic field of the outer rotor and the permanent magnetic field of the inner rotor propels the two rotors to rotate in opposite directions.

In a dual-rotor motor according to this invention, the electric current is conducted from a plurality of stationary electric terminals to the plurality of armature windings of the outer rotor via contacts of a plurality of sliprings, electrically connected to the leads of the armature windings, and brushes, electrically connected to the stationary terminals of the motor, respectively. The sliprings are mounted via a plurality of insulator-rings onto the shaft of the outer rotor and rotate together with the outer rotor. Each of the brushes is hold within a brush-holder. The terminals and the brush-holders are firmly attached to a terminals/brush-holders support, which is firmly attached to and easily removable from the motor enclosure together with the attached terminals and brush-holders.

This invention provides a dual-rotor electric traction motor with a simple and efficient cooling system producing a significantly higher rate of heat transfer from the rotors to the enclosure of the dual-rotor motor in comparison with the rate of heat transfer in the dual-rotor traction motors of the prior art. The dual-rotor electric traction motor according to this invention further comprises: a first outer rotor axial fan integrated into the first outer rotor side flange and a second outer rotor axial fan integrated into the second outer rotor side flange, wherein the two outer rotor axial fans operate in series and produce continuous internal close-loop air circulation within the cavities between the inner and outer rotors and between the outer rotor and the motor enclosure when the outer rotor rotates, for achieving a high rate of heat transmission through convection from the rotors to the motor enclosure.

This invention provides a dual-rotor electric traction motor with a simple and efficient cooling system, producing a significantly higher rate of heat transfer from the rotors to the enclosure of the dual-rotor motor in comparison with the heat transfer in the dual-rotor traction motor of the prior art, even in applications of the dual-rotor motor wherein the outer rotor is selectively mechanically immobilized and only the inner rotor rotates. In such applications, the dual-rotor electric traction motor according to this invention, in addition to the two outer rotor axial fans, further comprises: a first inner rotor axial fan coupled with the inner rotor shaft inside the outer rotor and situated within an inner substantially cylindrical extension of the first outer rotor side flange, and a second inner rotor axial fan coupled with the inner rotor shaft inside the outer rotor and situated within an inner substantially cylindrical extension of said second outer rotor side flange. The two inner rotor axial fans work in series with the two outer rotor axial fans to improve the internal close-loop air circulation when both rotors rotate, or to produce the internal close-loop air circulation when the outer rotor is selectively immobilized and only the inner rotor rotates.

These and other advantages of this invention over the prior art will become apparent from the following description and accompanying drawings.

DETAILED DESCRIPTION

Figure 1:
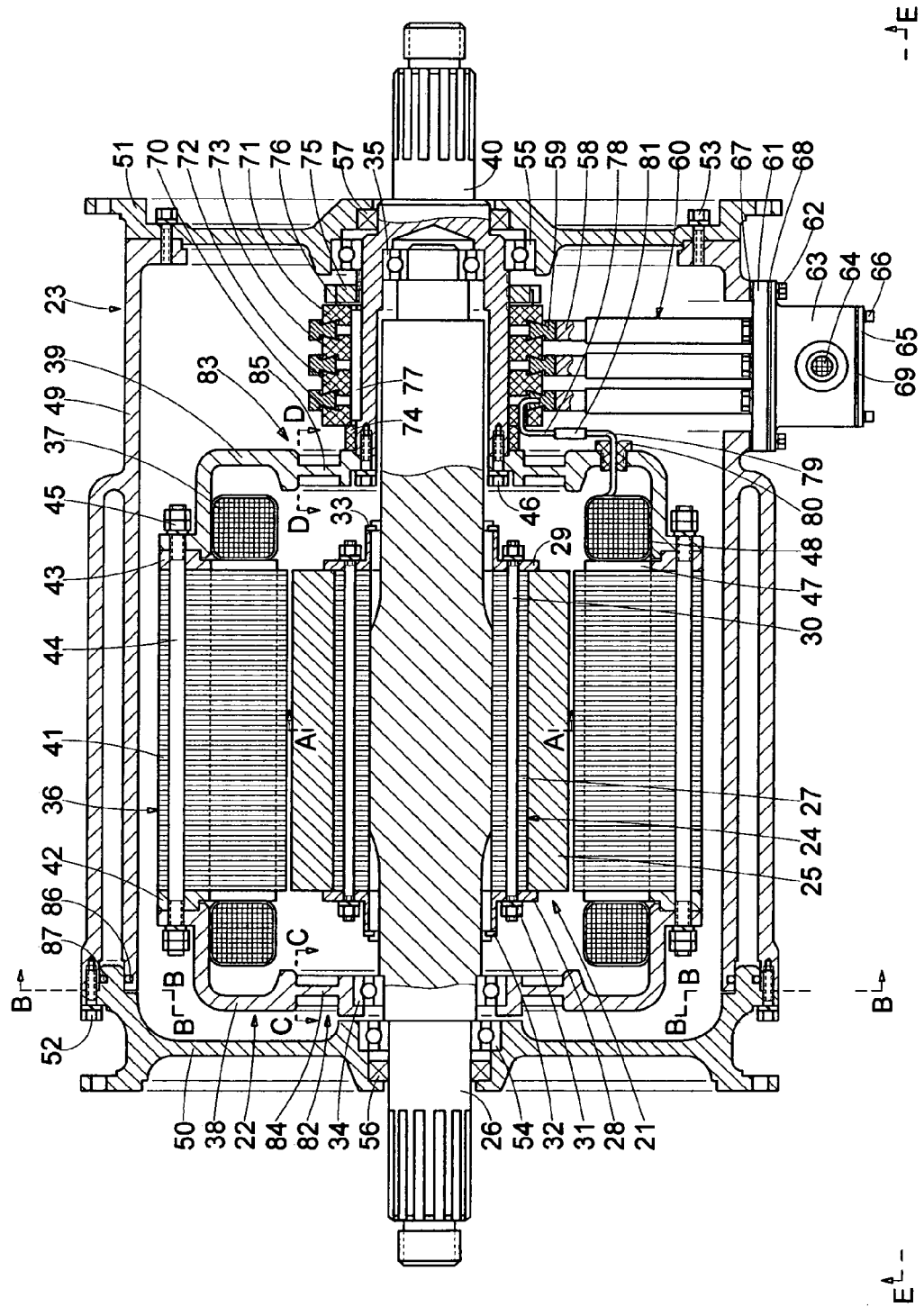
FIG. 1 is a schematic central longitudinal sectional view of a first embodiment of a dual-rotor motor according to this invention.

Referring now to FIG. 1, which illustrates a central longitudinal sectional view of a first preferable embodiment of a dual-rotor electric traction motor according to this invention, an inner rotor 21 is rotatably supported inside a coaxial hollow outer rotor 22. Both rotors are rotatably supported in a motor enclosure 23. The inner rotor is arranged to operate as the field of the motor, and the outer rotor is arranged to operate as the armature of the motor.

It is assumed that the view in FIG. 1 shows a horizontal central section of the dual-rotor motor, but this assumption is conditional, and is made only for convenience and clarity of drawings and description. For clarity of the drawing, the sections of some details, such as bearings, spring rings, and other details with small sections are without hatchings. For the same reason, shading of the components is avoided.

The inner rotor 21 includes an inner rotor field core 24, a plurality of permanent magnets 25 imbedded in parallel slots of the field core, and an inner rotor shaft 26. In this embodiment, the field core 24 is a laminated core made of a plurality of insulated identical lamellas 27. Two side bushings 28, 29, are attached to both sides of the field core, respectively. The side bushings and field core are firmly tightened together by a plurality of studs 30 and nuts 31. The side bushings are coupled with the inner rotor shaft 26 via splines of the side bushings and inner rotor shaft, respectively. The side bushings 28, 29 prevent an axial displacement of the permanent magnets and transmit the torque between the field core and the shaft of the inner rotor. The axial displacement of the entire inner rotor core is prevented by spring-rings 32, 33 imbedded in the inner rotor shaft. Two bearings 34, 35 rotatably support the inner rotor shaft 26 inside the outer rotor.

Figure 2:
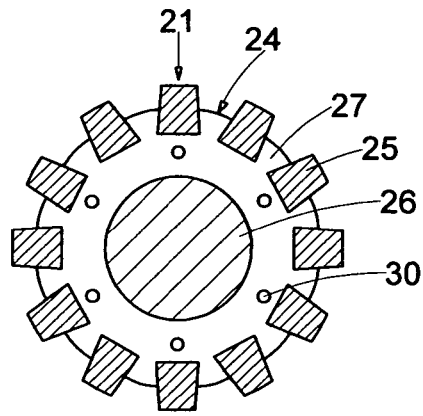
FIG. 2 is a partial sectional view A-A from FIG. 1.

Referring to FIG. 2, which illustrates sectional view A-A from FIG. 1 of the inner rotor 21 only, twelve permanent magnets 25 are evenly spread out in parallel slots around the circumference of the field core 24, which parallel slots have swallow-tail cross-sections. Six studs 30 pass through evenly distributed parallel holes within the field core. The above-mentioned specific numbers of these components are only for illustration of the inner rotor motor in this embodiment. In reality, the numbers of the permanent magnets and studs will be the choice of the designer of the motor. What is relevant to this invention is that the permanent magnets imbedded in the core of the inner rotor produce a permanent magnetic field, which is stationary in relation to the inner rotor. Therefore, the inner rotor acts as the field of the dual-rotor motor. Such an arrangement does not require any conduction of electric current to the inner rotor. This is one of the major advantages of the dual-rotor motor according to this invention over the prior art.

Referring back to FIG. 1, the outer rotor 22 is arranged to act as the armature of the dual-rotor rotor. The outer rotor includes a hollow cylindrical laminated armature core 36, a plurality of armature windings 37 imbedded in a plurality of parallel inside slots on the armature core respectively, two bell-shaped outer rotor side flanges 38, 39, and a partly hollow outer rotor shaft 40. In this embodiment, the armature core is made of a plurality of insulated identical lamellas 41 and two side discs 42, 43. The side discs provide surfaces for mounting and for coaxial alignment of the two outer rotor side flanges to the armature core. The first and second outer rotor side flanges 38, 39 are attached to both sides of the armature core 36 respectively, and are firmly tightened together with the armature core by a plurality of strong studs 44 and nuts 45. The studs 44 fit in a plurality of parallel holes of the armature core.

For clarity of the drawings, the lamellas 27 of the field core and the lamellas 41 of the armature core are illustrate by fine dividing lines, and the sectional views of the laminated cores 24, 36 are without hatching.

Figure 3:
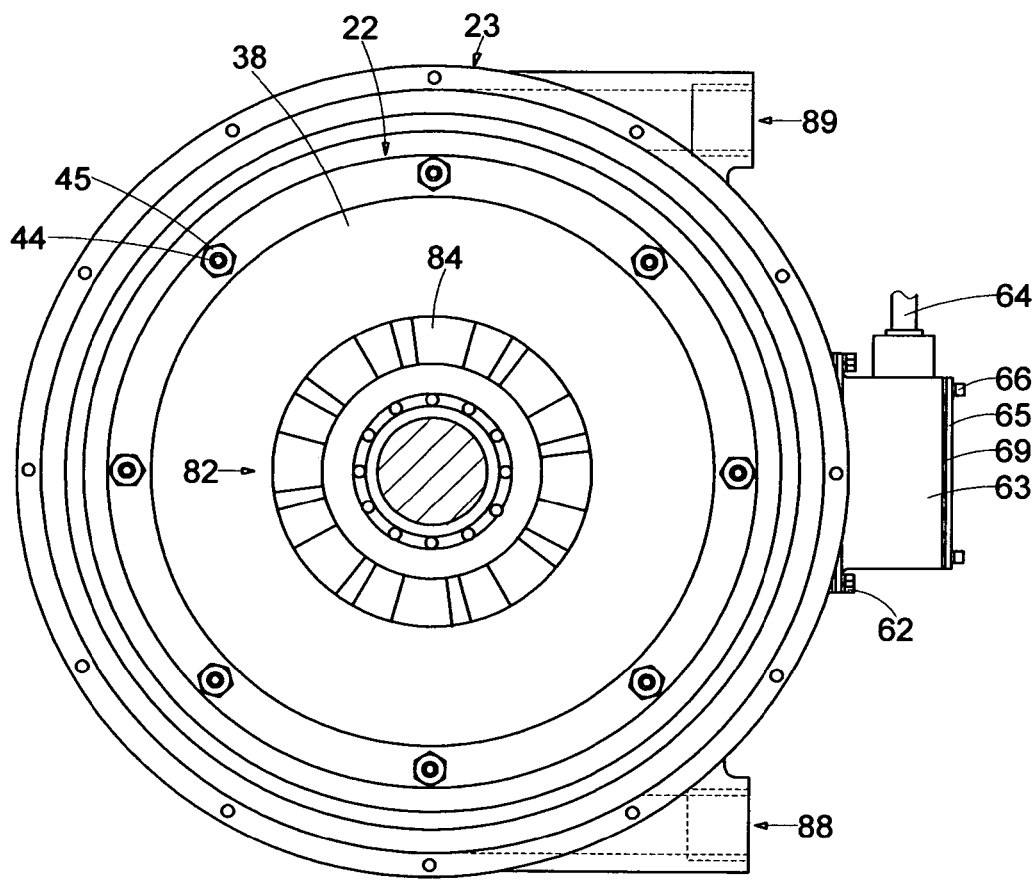
FIG. 3 is a sectional view B-B from FIG. 1.

Referring to FIG. 3, which illustrates sectional view B-B from FIG. 1, in this embodiment, eight studs 44 are evenly positioned along a circle coaxial to the axis of rotation. However, in practice the specific number of the studs is the choice of the designer of the motor. The sectional view in FIG. 3 has been rotated in the plane of the drawing 90° counterclockwise for showing the motor in its natural position.

Referring back to FIG. 1, the outer rotor shaft 40 is firmly attached to the second outer rotor side flange 39, coaxially to the armature core, by a plurality of bolts 46. The torque between the armature core and the shaft of the outer rotor is transmitted through the outer rotor side flange 39. The armature windings are insulated inside the slots of the armature core by a plurality of appropriate insulators 47, and are protected outside the slots of the armature core by insulation 48. The substantially cylindrical inner surfaces of the two bell-shaped side flanges 38, 39 of the outer rotor provide support for the parts of the armature windings, which parts are outside the slots of the armature core, against the action of the centrifugal forces.

In this embodiment, the motor enclosure 23 includes a central substantially cylindrical enclosure 49 and two motor enclosure side flanges 50, 51. A first motor enclosure side flange 50 is firmly attached to one of the sides of the central cylindrical enclosure 49 by a plurality of bolts 52, and a second motor enclosure side flange 51 is firmly attached to the other side of the central cylindrical enclosure by a plurality of bolts 53. A bearing 54 in the first motor enclosure side flange supports the inner motor shaft 26, and a bearing 55 in the second motor enclosure side flange supports the outer rotor shaft 40. Thus, both rotors are coaxial to the central cylindrical enclosure. Two slip-seals 56, 57, imbedded in the first and second motor enclosure side flanges respectively, seal around the shafts of the inner and outer rotor respectively.

In FIG. 3, illustrating sectional view B-B from FIG. 1, and in all similar sectional views of the other embodiments described herein later, for clarity and simplicity of the drawings, the motor enclosure 23 is shown as if the first motor enclosure side flange 50 has been removed.

Substantial clearances between the outer surfaces of the outer rotor 22 and the inner surfaces of the motor enclosure 23 are provided for allowing internal air circulation, as described herein later.

The conduction of the electric current between the stationary terminals of the motor and the rotating windings of the armature is achieved via sliding contacts between brushes and sliprings. In this embodiment, three brushes 58, electrically connected to three stationary terminals of the motor, make contacts with three sliprings 59, electrically connected to the windings of the motor armature respectively. The brushes are supported within three brush-holders 60 respectively. For simplicity of drawings, and since the details of similar terminals, brushes, and brush-holders are well known in the art, they are not shown, but rather are only described herein after.

The terminals and brush-holders are firmly attached to a terminals/brush-holders support 61, which is made of a hard, strong insulating material. The terminals/brush-holders support is firmly attached by a plurality of bolts 62 to a flat mounting surface around an opening of the cylindrical motor enclosure 49. A terminal enclosure 63 is also firmly attached to the terminals/brush-holders support 61 by bolts 62. This enclosure protects the terminals and provides a sealed port for an electric cable 64, which connects the terminals of the dual-rotor motor with the terminals of the dual-rotor motor controller. For simplicity of drawing and description, the details of the cable port are not shown. A terminal cover 65, firmly attached to the terminal enclosure by a plurality of screws 66, provides easy access to the terminals. A gasket 67 prevents the access of moisture and dirt to the motor enclosure, and two gaskets 68, 69 prevent the access of moisture and dirt to the terminal enclosure.

It is assumed that each brush is free to slide in its brush-holder, so that it may follow any small irregularities in the curvature of the respective slipring. It is also assumed that each brush is pressed to the respective slipring by a periodically adjustable spring, and each brush makes contact with a considerably large arc of the circumference of the respective slipring, so that a very good sliding contact is maintained at relatively low pressure. Under such arrangement, the frictional wear of brushes and sliprings is minimal. It is assumed that each brush is electrically connected to the respective terminal via flexible braided copper wires (pigtails), allowing the brush to slide in the brush-holder. The brush-holders are exposed inside the motor enclosure for direct air-cooling. The electric lines from the terminals to the brushes are insulated from each other and from the motor enclosure.

In this embodiment, the described above entire block of the terminals/brush-holders support with the terminals, brush-holders, and terminal enclosure is shown in an overall horizontal position. It shall be understood, however, that this horizontal position is conditional and has been selected here only for convenience and clarity of drawing. In fact, in any specific design, the block of brushes and terminals may be in any generally radial position, in some angle in relation to the central horizontal plane of the motor, which position can provide protection, access to, and easy disconnection and removal of these components from the motor enclosure for maintenance checks and repairs.

In this embodiment, three slip-rings 59 are mounted onto the outer rotor shaft 40 and are insulated from each other and from the outer rotor shaft via two side insulator-rings 70, 71 and two intermediate insulator-rings 72, 73. A spacer-bushing 74 is mounted onto the outer rotor shaft between the insulator ring 70 and the second outer rotor side flange 39. The insulator-rings and spacer-bushing are made of hard, high-strength insulating material. The sliprings and insulator-rings have swallow-tail cross-sections in opposite directions. Tapered surfaces on both sides of each slipring match the tapered surfaces of the respective insulator-rings, which are on both side of the slipring. When the insulator-rings, sliprings, and spacer-bushing are tightened together to the second outer rotor side flange by a crown-nut 75, the sliprings are centered coaxially to the outer rotor shaft, and significant forces between sliprings and insulator-rings are created. A lock-washer 76 locks the crown-nut 75 to the outer rotor shaft. A key 77 couples the insulator-rings to rotate with the outer rotor. Each slipring has at least one single-wire slipring conductor 78 soldered to the inner side of the slipring. Before the assembly, the slipring conductors are bent close to the inner surface of the respective slipring and extend in an axial direction. At a preliminary assembly of sliprins and insulator-rings, the slipring conductors are passed through respective holes in the insulator-rings, which holes are parallel to the axis of rotation, and then the slipring conductors are bent radially outwards in a plane substantially perpendicular to the axis of rotation. For simplicity of drawing and description, only one slipring conductor of only one slipring is shown. The sliprings and insulator-rings are mounted on the outer rotor shaft 40 in the cavity between the second outer rotor side flange and the second motor enclosure side flange.

In this embodiment, a plurality of leads 79 of the armature windings 37 pass through the second outer rotor side flange 39 via insulator-bushings 80, which are screwed to the second outer rotor side flange after the assembly of the second outer rotor side flange with the armature core. Then, outside the second outer rotor side flange, each lead 79 of the armature windings is bent radially inwards and connected with a respective slip-ring conductor 78 via a solder splicer 81. No significant slack of the armature lead and slipring conductor shall be allowed during soldering. The specific number of leads of the armature windings, insulator bushings, and solder splicers, respectively, depends on the specific arrangement of the armature windings and is therefore the choice of the designer of the motor. For simplicity of drawing and description, only one connection between the armature windings and a slipring is shown. The described herein above arrangement protects the connected electrical conductors against deflection and weir that may be caused by centrifugal forces. The connection shown and described here, however, illustrates only one of a number of possible different arrangements.

The operation of the dual-rotor traction motor, according to this invention, is controlled by a motor controller, which is not shown for simplicity of drawing and description. The motor controller and the armature of the dual-rotor motor are arranged so that when the motor is energized and electric current flows through the windings of the armature, the armature produces an electromagnetic field, which rotates in relation to the outer rotor. The interaction between the revolving magnetic field of the outer rotor and the fixed magnetic field of the inner rotor propels the two rotors to rotate in opposite direction. The windings of the armature and the motor controller are arranged so that the opposite directions of rotation of the rotors are selectively reversible. In response to an external control command, the motor controller pre-selects the direction of rotation of the revolving electromagnetic field of the outer rotor, and in response to a variable external control command, the motor controller varies the magnitude of the electric current through the windings of the motor armature. Thus, the opposite directions of rotation of the rotors are pre-selected, and the variable torque-speed output of the dual rotor motor is controlled via the motor controller. In essence, the motor controller of a dual-rotor electric traction motor employs the same means and operates in the same way as the controller of a conventional electric traction motor of the same electrical kind. Therefore, the dual-rotor motor controller is not further described.

It is assumed that the illustrated herein embodiment of a dual-rotor electric traction motor represents a three-phase alternating-current synchronous electric machine. This electrical characteristic, however, shall be considered only as a preferable one, since other arrangements may be possible also. What is relevant for the purpose of this invention is that the interaction between the revolving electromagnetic field of the armature of the outer rotor and the fixed magnetic field of the inner rotor drives both rotors to rotate in opposite directions. Said differently, the electromagnetic forces between the two rotors of the dual-rotor traction motor propel the two rotors to rotate in opposite directions.

It is assumed that the dual-rotor traction motor and its controller, according to this embodiment of the invention, are further arranged to selectively operate the dual-rotor traction motor as an electric braking generator for converting part of the kinetic energy of the vehicle into electric energy during speed retardation or braking of the vehicle. In such an arrangement, the two rotors are driven to rotate in opposite directions through the respective drive trains by the kinetic energy of the vehicle. The dual-rotor motor will also selectively operate as an electric braking generator if the outer rotor is selectively immobilized and only the inner rotor is driven by the kinetic energy of the vehicle.

In this embodiment, two outer rotor axial fans 82, 83 are integrated within the two outer rotor side flanges 38, 39 respectively.

A first outer rotor axial fan 82 includes a plurality of identical radial blades 84, connecting a substantially cylindrical surface of the hub of the first outer rotor side flange with a larger substantially cylindrical surface of the first outer rotor side flange. These substantially cylindrical surfaces of the first outer rotor side flange are coaxial to the axis of rotation. The blades are evenly spread out between the two substantially cylindrical surfaces. The blades 84 and the two substantially cylindrical surfaces, which constitute the first outer rotor axial fan 82, are inseparable parts of the first outer rotor side flange. The openings between the blades of the first outer rotor axial fan connect the space inside the outer rotor with the space between the outer rotor and the first side flange of the motor enclosure.

A second outer rotor axial fan 83 includes a plurality of identical radial blades 85, connecting a substantially cylindrical surface of the hub of the second outer rotor side flange with a larger substantially cylindrical surface of the second outer rotor side flange. These substantially cylindrical surfaces of the second outer rotor side flange are coaxial to the axis of rotation. The blades are evenly spread out between the two substantially cylindrical surfaces. The blades 85 and the two substantially cylindrical surfaces, which constitute the second outer rotor axial fan 83, are inseparable parts of the second outer rotor side flange. The openings between the blades 85 connect the space inside the outer rotor with the space between the outer rotor and the second side flange of the motor enclosure.

Referring to FIG. 3, the first outer rotor axial fan 82 has eight identical blades 84. It is assumed that the number and arrangement of the blades 85 of the second outer rotor axial fan 83 are the same as those of the first outer rotor axial fan. In such a design, the two outer rotor axial fans have substantially the same air flow capacity, which is beneficial to the operation of the fans, and also, both outer rotor side flanges can be machined from the same die-casting, which is beneficial to the manufacturing of the dual-rotor motor. However, in practice, the specific numbers of the blades of the axial fans are the choice of the designer of the motor.

The blades 85 of the second outer rotor axial fan 83 shall be strong enough to safely withstand the combined stress from the torque (transmitted from the core of the outer rotor to the outer rotor shaft) and the centrifugal forces.

Figure 4:
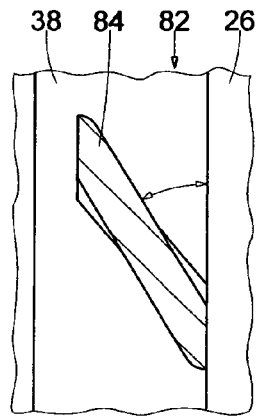
FIG. 4 is a partial sectional view C-C from FIG. 1, on a larger scale.
Figure 5:
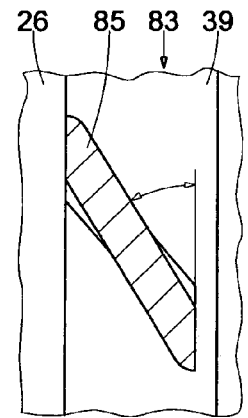
FIG. 5 is a partial sectional view D-D from FIG. 1, on a larger scale.

FIG. 4 and FIG. 5 are partial sectional views C-C and D-D from FIG. 1 respectively, in a larger scale. These partial sectional views schematically illustrate sections taken along the outer cylindrical surfaces of the outer rotor axial fans 82, 83 respectively, where a blade 84 of the first outer rotor axial fan 82 and a blade 85 of the second outer rotor axial fan 83 respectively connects with these surfaces. Each of these cylindrical sections is shaped by two parallel cylindrical spiral lines, and two parallel arcs. Each of these three-dimensional shapes is projected in the plane of the drawing as a parallelogram. The sharp corners of the parallelogram, which illustrate the cutting edges of the blades, are half-rounded for facilitating die-casting of the outer rotor side flanges, and for reducing the noise during the operation of the fans. The attack angles of the blades of both outer rotor axial fans are in the same direction, in relation to the direction of rotation, as sown by arrowed arcs in both figures. The described here details of the outer rotor fans, however, are for illustrating this embodiment of the invention. The specific arrangement of the fans will depend much on the method of manufacturing of the outer rotor side flanges, and, therefore, it may differ from the arrangement described herein above.

The outer rotor axial fans with the described above construction of the blades will produce substantially the same air flow in either of both axial direction, depending on the direction of rotation of the outer rotor. When the outer rotor rotates, the two axial fans produce air flow in the same direction (i.e., both axial fans work in series), generating a continuous internal close-loop air circulation between the inner and outer rotors and between the outer rotor and the inner surfaces of the motor enclosure.

In fact, the axial motion of the air, caused by the rotation of the axial fans, and the rotational motion of the air, caused by the rotations of the rotors, combine in a complicated spiral-like turbulent internal air circulation. This continuous internal close-loop air circulation prevents any formation of air pockets with excessively high temperature within the outer rotor and within the motor enclosure. The circulation equalizes the temperature of the air inside the motor, and significantly increases the rate at which the heat is transferred by convection from the rotors to the air, as well as from the air to the motor enclosure. Thus the heat is efficiently transferred from the outer and inner rotors, wherein the heat is generate, to the motor enclosure, from where the heat is dissipated into the environment via an external liquid-cooling or air-cooling system.

The mechanical efficiency of the axial fans generally depends on the total resistance against the air flow within the cavities inside the dual-rotor motor. The rotating axial fans not only produce an airflow, but also generate heat. In a well-designed system, the improvement of the rate of heat transfer shall well surpass the negative effect of heat generation by the fans themselves. For reducing the internal resistance and improving mechanical efficiency of the fans, the cavities between the outer rotor and the motor enclosure, and particularly the cavity between the first outer rotor side flange and the first motor enclosure side flange, shall be designed as smooth as possible aerodynamically. The circulating air flow will experience a strong resistance when passing between the two (rotating in opposite directions) rotors. This resistance will be particularly strong at high rotational speeds of the rotors. Therefore, the distance between the inner and outer rotor cores, as well as the distance between the permanent magnets of the inner rotor shall provide sufficient passage for the air. Fortunately, the fans, according to this invention, at higher rotational speeds will produce stronger airflow. This stronger airflow, however, is accompanied with higher pressure, generation of more heat, and, therefore, with lower efficiency of the cooling. The axial fans shall be designed to produce sufficient air flow for effective cooling of the dual-rotor motor at low-speed/high-torque operational conditions, but not to produce an air circulation with excessive velocity at high-speed operational condition. It is well known in the art that an increase in the velocity of the air flow above certain value does not reflect in a much grater heat transfer rate, while it requires much more power.

Overall, the number and the attack angle of the blades of both outer rotor axial fans shall be such that the fans produce a close-loop air circulation sufficient for effective cooling of the dual-rotor motor at low rotational speeds of the outer rotor, but do not produce excessive internal pressure and velocity of the air at high rotational speeds of the outer rotor, although some increase in the pressure and velocity of the air, and, therefore, reduction of the efficiency at higher rotational speeds are unavoidable.

A preferable method for manufacturing the two outer rotor side flanges with the integrated outer rotor axial fans will be die-casting and following machining.

In this first embodiment, an external liquid-cooling system cools the motor enclosure 23. Usually, a motor liquid-cooling system includes a radiator and a fan for cooling the hot liquid coolant coming from the motor, a pump for circulating the coolant between the motor enclosure and radiator, and a plurality of connecting lines. Since such liquid-cooling systems are well known in the art, and for simplicity of drawings and description, the entire external cooling system is not shown, but only an arrangement of the motor enclosure for liquid cooling is illustrated and described.

Figure 6:
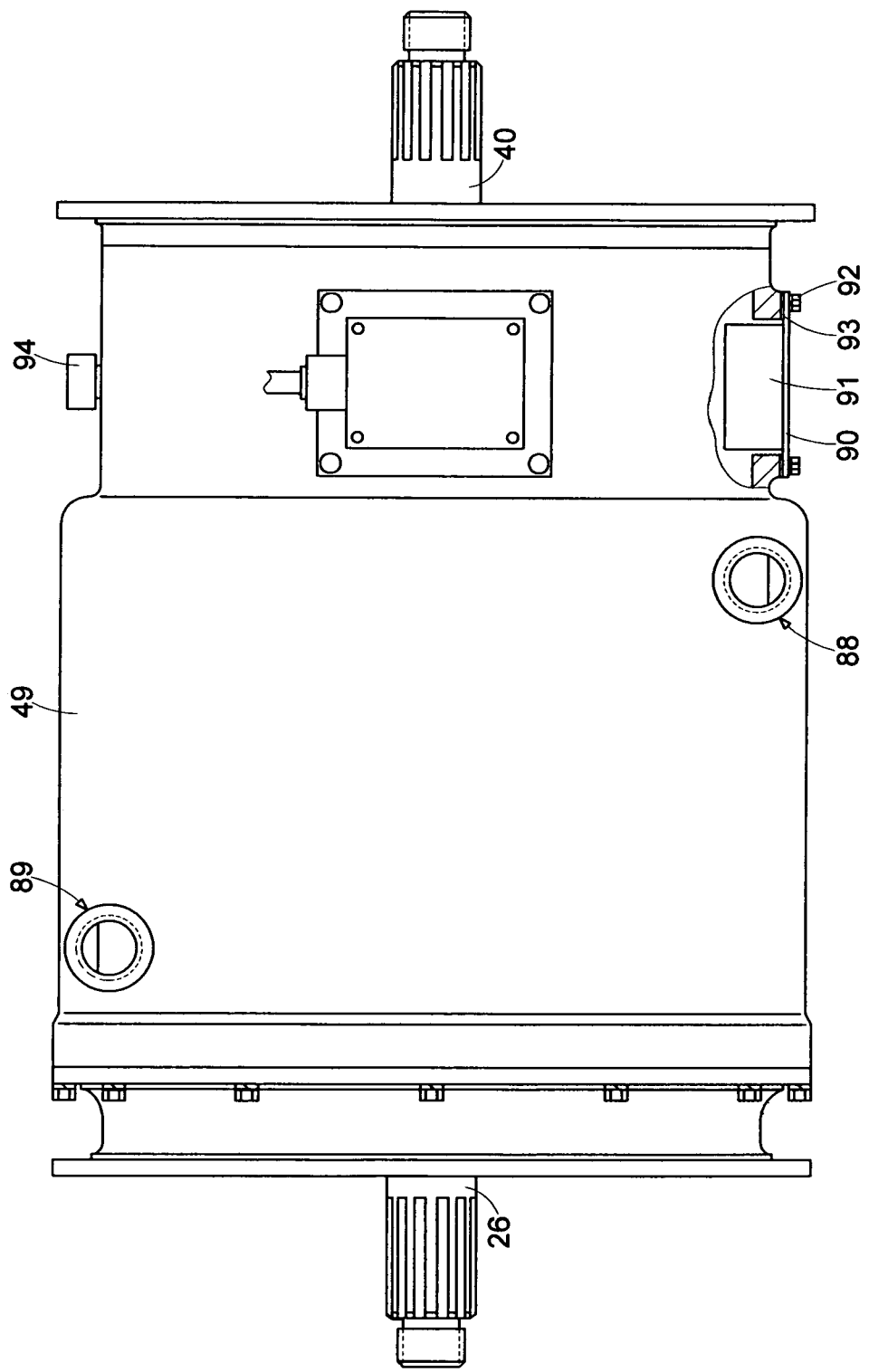
FIG. 6 is a view E-E from FIG. 1.

Referring to FIG. 1, FIG. 3, and FIG. 6, in this embodiment, a part of the central cylindrical enclosure 49 has a double wall forming a substantially cylindrical cavity, in which the liquid coolant can flow. The first motor enclosure side flange 50, closes this cylindrical cavity, and two O-rings 86, 87 seal between the cylindrical enclosure and the first motor enclosure side flange.

An inlet port 88 and an outlet port 89 are provided for connecting the cylindrical cavity within the cylindrical motor enclosure with the external cooling system. Both ports are parts of the cylindrical enclosure. The inlet port is located in the lower part of the cylindrical enclosure, close to one end of the cylindrical cavity and is substantially tangential to that cavity, while the outlet port is located in the upper part of the cylindrical enclosure, close to the other end of the cylindrical cavity and is substantially tangential to that cavity. Both ports are on the same side of the cylindrical enclosure. For convenience of the drawing, both ports are shown on the side of the motor terminals, but they can be as well on the opposite said of the motor in relation to its central longitudinal vertical plane. At the described here arrangement, the external cooling system will produce a substantially spiral flow of the liquid coolant within the cavity of the cylindrical enclosure. Such a flow of the liquid coolant, combined with a countercurrent flow of the air between the outer rotor and the motor enclosure, can produce a very effective cooling to the dual-rotor motor.

In the described herein above embodiment, during most of the operational time of the dual-rotor traction motor (i.e., during the operation corresponding to a forward motion of the vehicle powered by the dual-rotor motor) a countercurrent air flow and liquid coolant flow can be easily achieved by appropriate combination of the direction of rotation of the outer rotor, the attack angle of the blades of the axial fans, and the location of the ports for the liquid coolant. Otherwise said, the spiral flow of the air between the core of the outer rotor and the motor enclosure can be in opposite direction to the spiral flow of the liquid-coolant within the cavity of the cylindrical enclosure during most of the operational time of the dual-rotor traction motor.

The described above design of the liquid cooling of the motor enclosure is only one of a number of different possible arrangements. In addition, it shall be understood that the external cooling of the dual-rotor motor may be also achieved via an appropriate air-cooling system, if the location of the motor in the vehicle and other design circumstances allow such a solution. Then, the cylindrical enclosure 49 will have fins along its outer surface (instead of the cavity for liquid cooling) for enlarging the area of the outer surface and improving the rate of heat dissipation. Because external air-cooling systems for motors of self-propelled vehicles are well known in the art, herein, for simplicity of drawings and description such a system is not shown and described in detail.

Referring to FIG. 6, a partial section shows schematically an opening at the bottom of the cylindrical enclosure 49, covered by an access cover 90. An air-filter 91 is attached to the access cover inside the cylindrical enclosure. The access cover is firmly attached to the cylindrical enclosure by bolts 92, and the access of moisture and dirt into the motor enclosure is prevented by a gasket 93. The purpose of the air-filter is to catch small particles of the materials of brushes and sliprings, (produced by the unavoidable wear of brushes and sliprings) and, thus, to protect the air inside the dual-rotor motor from contamination. For simplicity of drawings and description, the details of the air filter and its attachment to the access cover are not shown and described.

A breather 94 is firmly attached to the motor enclosure, for allowing limited access of air in and out of the motor enclosure, while preventing access of moisture and dirt into the motor enclosure. The breather keeps the pressure inside the motor enclosure in acceptable limits. Since such breathers are well known in the art, the details of the breather are not shown or described. The breather, however, is an optional component and is the choice of the designer of the motor.

In FIG. 1 and FIG. 6, the parts of the inner rotor shaft 26 and outer rotor shaft 40 that extend respectively in opposite directions out of the motor enclosure are shown ending with splines and threads. This arrangement is only for illustration of this embodiment of the invention. In fact, the specific design of the output end of the shaft of each rotor will depend on the design of the components of the drive train, which are coupled to the respective shaft. Therefore, the specific design of each rotor shaft is the choice of the designer of the motor.

Some means allowing a firm attachment of the enclosure of the dual-rotor motor to the frame of the vehicle or to some other stationary component(s) of the drive system are provided. In this embodiment of the invention, the two side flanges 50, 51 of the motor enclosure 23 have additional mounting surfaces and bolt holes for flange-mounting of the dual-rotor motor to some other component of the vehicle (for example to the enclosure of a transmission), or for flange-mounting of some other stationary component of the drive system (for example the enclosure of a planetary gear reducer) to the motor enclosure. It shall be understood, however, that a flange-mounting is only one of a number of different possible ways for attaching the dual-rotor motor to the vehicle structure, which cares the motor. The specific means for attaching the motor will depend on the specific arrangement of the matching mounting means of the components, to which the motor is attached. For example, if the dual-rotor motor is mounted upon the frame of the vehicle, then appropriate mounting legs shall extend from the lower, middle, or upper part of the motor enclosure respectively, depending on the location of dual-rotor motor in relation to the motor mounts of the frame and of whether the motor is mounted above or bellow the frame. Therefore, it is clear to the skilled in the art, that the specific means allowing a firm attachment of the dual-rotor motor enclosure to other stationary components of the vehicle, or vice-versa, depends on the specific application of the motor, and is the choice of the designers of the motor.

The axial fans of the described herein above first preferable embodiments of a dual-rotor motor according to this invention will produce an internal close-loop air circulation only when the outer rotor rotates. In some vehicle four-wheel drive systems, however, the dual-rotor traction motor is arranged to selectively operate also as a conventional motor. In such a system, the outer rotor is selectively mechanically immobilized, (usually by a brake), and then only the inner rotor drive the vehicle (See the inventor's U.S. Pat. No. 6,005,358 Radev). It is obvious that when the outer rotor is immobilized, the fans integrated within the outer rotor side flanges will not rotate, and will not produce the internal air circulation needed for effective cooling of the dual-rotor motor. The description of a second preferable embodiment of the dual-rotor motor, which provides a solution of the cooling of the motor regardless whether both rotors rotate or only the inner rotor rotates during the operation of the motor, follows herein below.

For simplicity of drawings and description, in the described herein after embodiments of the dual-rotor motor according to this invention, generally only the components that are different from those of the previously described embodiments are discussed and designated with new numbers. Nevertheless, in some figures, the numbers of some previously described components are shown, when that has been deemed necessary for simplicity and clarity of the description. All other components and their functions, as well as the operation of the dual-rotor motor shall be considered the same as described with the previous embodiment(s).

Figure 8:
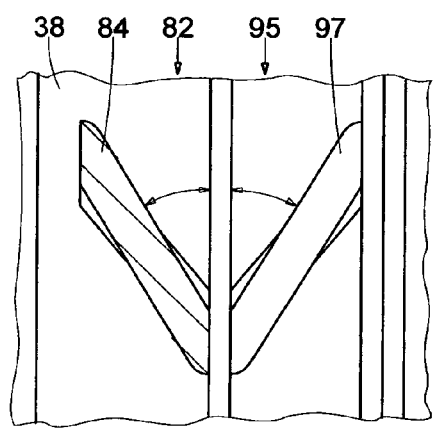
FIG. 8 is a partial sectional view F-F from FIG. 7, on a larger scale.
Figure 9:
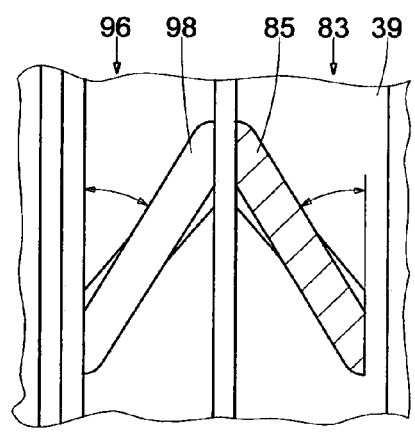
FIG. 9 is a partial sectional view G-G from FIG. 7, on a larger scale.
Figure 7:
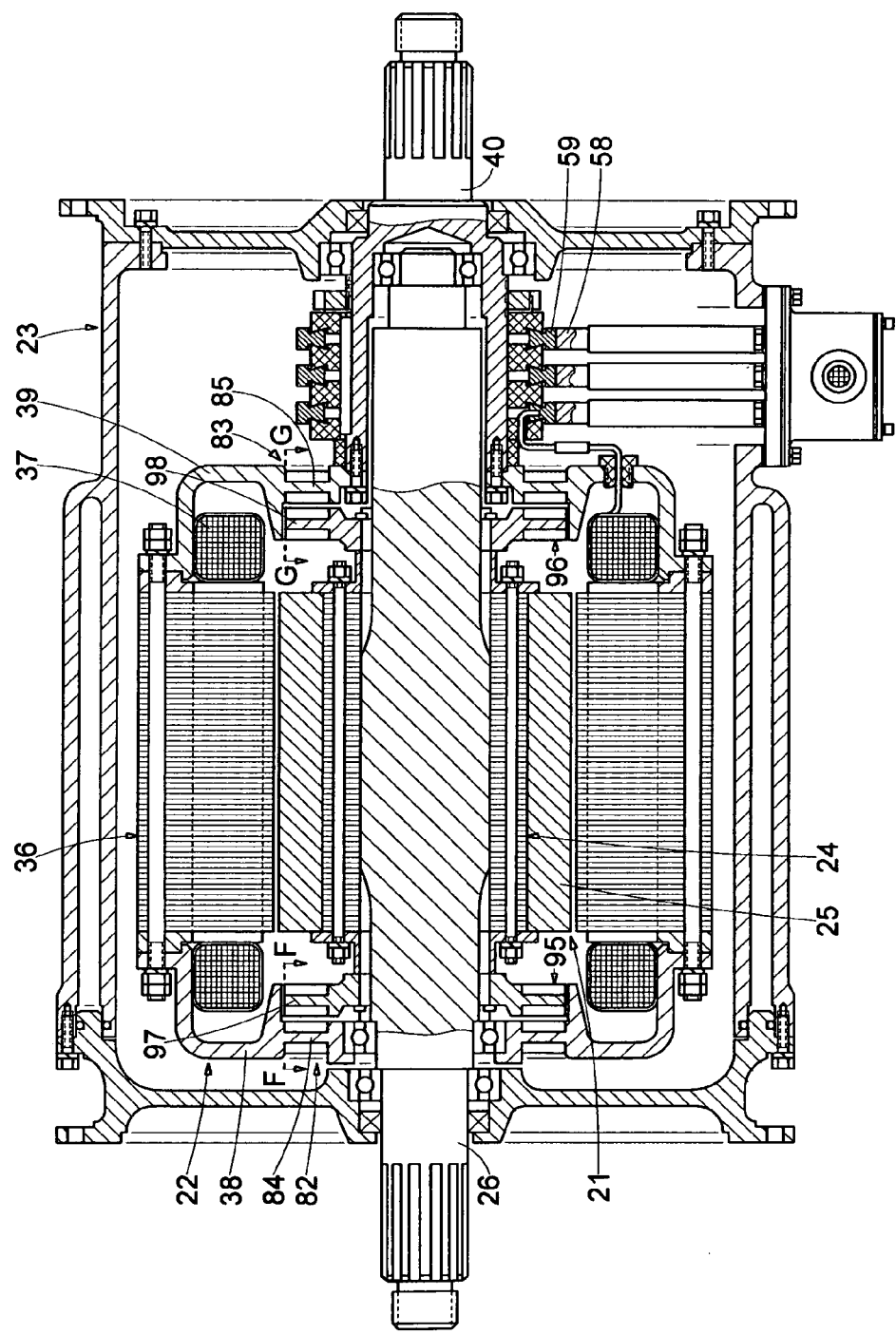
FIG. 7 is a schematic central longitudinal sectional view of a second embodiment of a dual-rotor motor according to this invention.

Referring now to FIG. 7, FIG. 8, and FIG. 9, illustrating a second (most) preferable embodiment of this invention, in addition to the two outer rotor axial fans 82, 83 integrated within the two outer rotor side flanges respectively, two similar inner rotor axial fans 95, 96 are mounted onto and coupled with the inner rotor shaft 26, inside the outer rotor. These two inner rotor axial fans are positioned on both sides of the inner rotor core respectively, close to the two outer rotor axial fans respectively. The blades 97, 98 of the inner rotor fans 95, 96 are arranged in a similar way as the blades 84, 85 of the outer rotor axial fans 82, 83, described with the first embodiment (FIG. 1, and FIG. 3 to FIG. 5), with the exception that the blades of each inner rotor axial fan are connected only with a substantially cylindrical hub of the fan and rotate within an inner substantially cylindrical extension of the respective outer rotor side flange.

As shown in FIG. 8 and FIG. 9, which are schematic partial cylindrical sectional views F-F and G-G from FIG. 7 respectively, the attack angles of the blades 97, 98 of both inner rotor fans 95, 96 are in the same direction, in relation to the direction of rotation, but they are in opposite direction in relation to the attack angles of the blades 84, 85 of the outer rotor axial fans 82, 83. Consequently, at opposite directions of rotation of both rotors, the four axial fans work in series and produce air flow in the same axial direction.

The two inner rotor axial fans, can be entirely identical, as shown in the figures. At such a design both inner rotor axial fans will have substantially the same air flow capacity, which is beneficial to the operation of the fans, as well as to the manufacturing of the dual-rotor motor. In fact, all four axial fans can have the same air flow capacity, if both rotor rotate in opposite directions with the same speed. However, if the dual-rotor traction motor is incorporated in a system wherein both rotors rotate with different speeds, then the outer rotor fans and the inner rotor fans shall have substantially equal capacities at these different speeds, as much as that can be achieved. Such arrangements will produce the best possible air circulation at minimum power consumption.

All other components and the operation of the dual rotor motor in the described above second (most) preferable embodiment are the same as those of the first preferable embodiment, and are therefore not further discussed.

Figure 10:
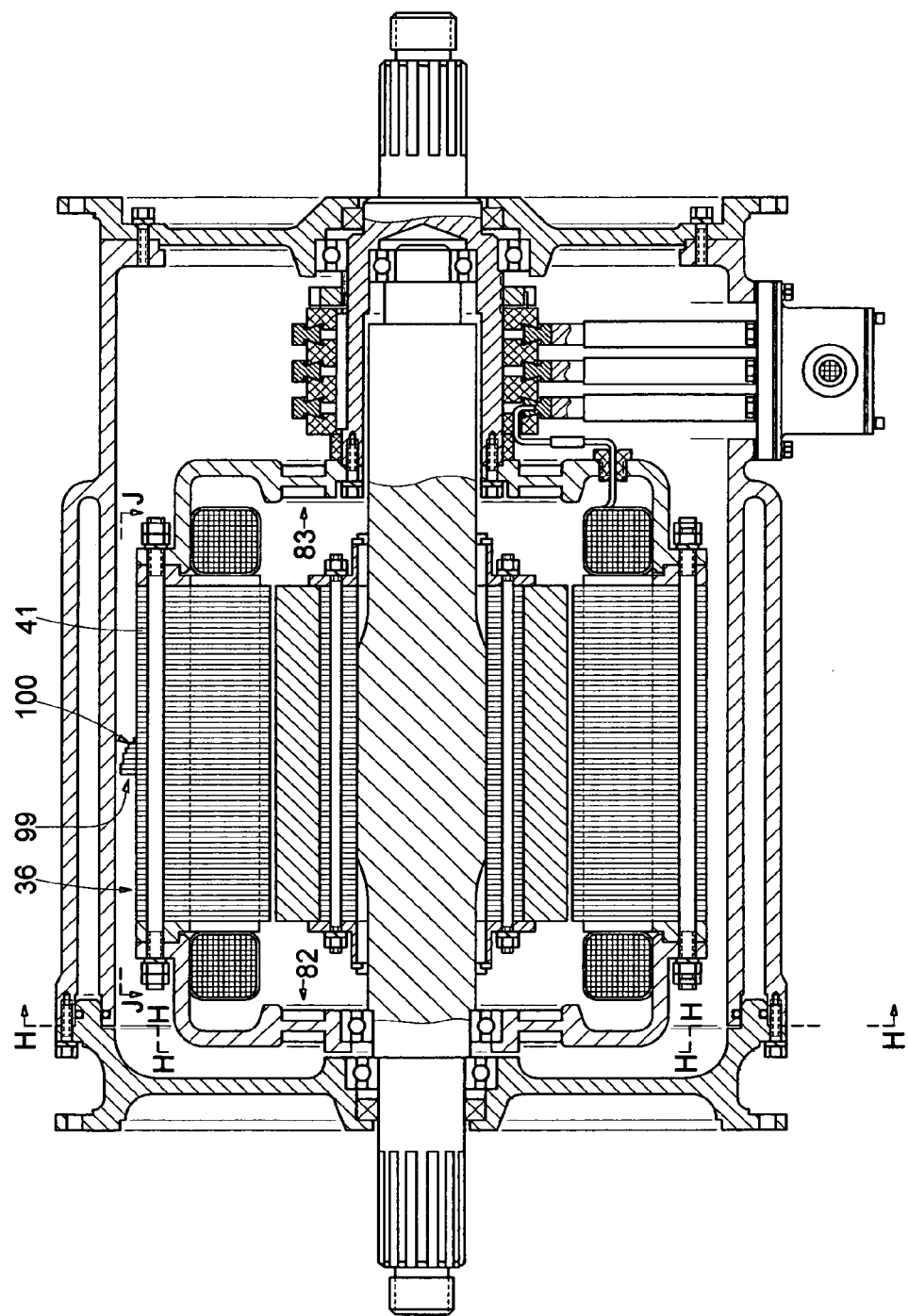
FIG. 10 is a schematic central longitudinal sectional view of a third embodiment of a dual-rotor motor according to this invention.
Figure 11:
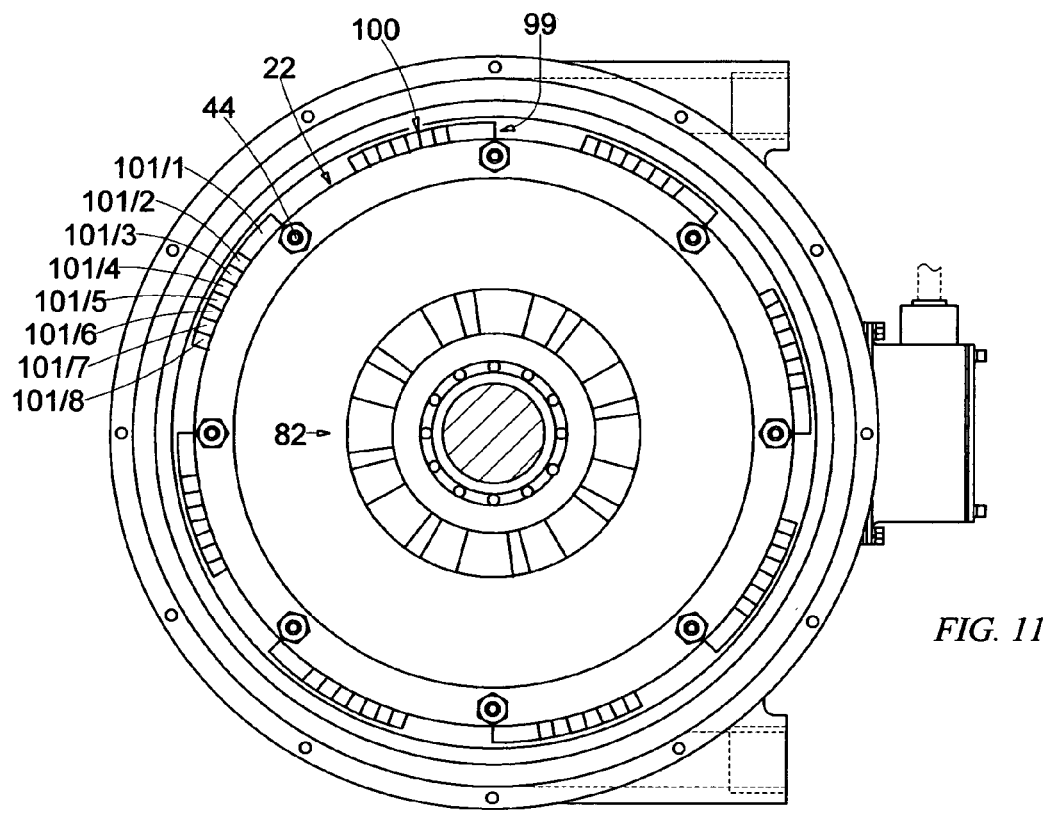
FIG. 11 is a sectional view H-H from FIG. 10.
Figure 12:
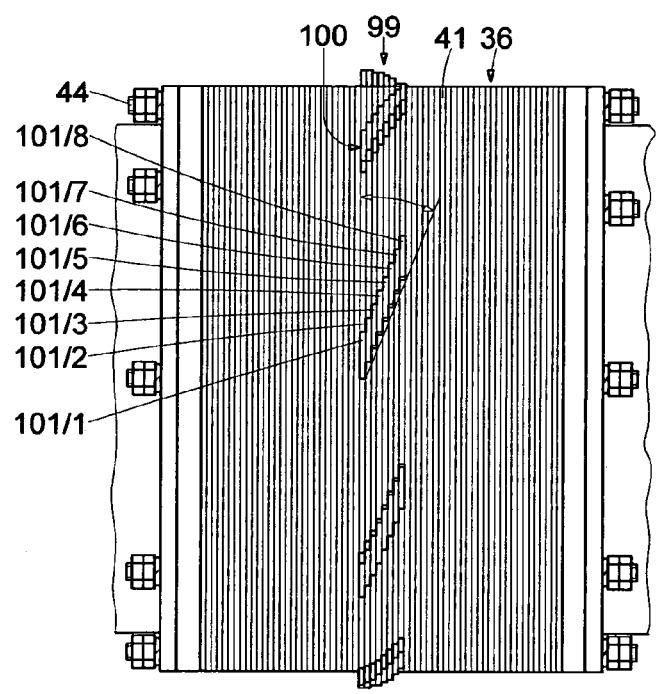
FIG. 12 is a partial sectional view J-J from FIG. 10.

Referring now to FIG. 10, FIG. 11, and FIG. 12, which illustrate a third embodiment of a dual-rotor motor according to this invention, in addition to the two outer rotor axial fans 82, 83 of the first embodiment, an inseparable part of the armature core 36 is arranged as a peripheral axial fan 99 between the outer cylindrical surface of the armature core and the inner cylindrical surface of the motor enclosure. The sectional view in FIG. 11 has been rotated in the plane of the drawing 90° counter-clockwise for showing the motor in its natural position.

In this embodiment, eight blades 100 are evenly spread out upon the outer cylindrical surface of the armature core. The blades are made of eight radial extensions of each of eight lamellas 101 (101/1 to 101/8), which extensions are evenly spread out upon the cylindrical circumference of each lamella, starting from a circumference equal to the circumference of the lamellas 41 without radial extensions and extending to a cylindrical circumference close to the inner cylindrical surface of the motor enclosure. The lamellas 101 with radial extensions are identical, with the exception that the eighth radial extensions of each consecutive lamella (101/1 to 101/8) are displaced angularly, in relation to the positions of the mounting holes for the studs 44 of the outer rotor core 36. The angular displacements between the radial extensions of each consecutive lamella are equal and are selected so that, when assembled in the outer rotor core, the radial extensions of each lamella partly overlap the radial extensions of the previous lamella respectively. Here, the number (eight) of the lamellas 101 and the number (eight) of the radial extensions of these lamellas are selected only for illustration of this embodiment. In fact, by a combination of the number and overlapping of the radial extensions, with the thickness of the lamellas 101, the designer of the motor can determine appropriate length and attack angle of the blades 100.

The attack angle of the blades of the peripheral axial fan 99, in relation to the direction of rotation, illustrated by an arrowed arc in FIG. 12, is in opposite direction in comparison withy the direction of the attack angle of the blades of the axial fans 82, 83 integrated within the outer rotor side flanges (Compare FIG. 12 with FIG. 4 and FIG. 5). When the outer rotor rotates, the peripheral axial fan 99 produces an air flow between the armature core and the inner surface of the cylindrical motor enclosure in opposite axial direction to the axial direction of the air flow produced by the two outer rotor axial fans 82, 83. Thus, the three fans (which are integrated with the outer rotor) work in series and produce an internal close-loop air circulation. The blades of the peripheral axial fan not only contribute to the air circulation, but also provide additional surfaces for better cooling of the armature core.

The lamellas for the laminated cores of the electric machines are usually made by stamping. The stamping of several lamellas 101, which differ only in the angular locations of their (otherwise identical) peripheral radial extensions, can be easily achieved via an adjustable cutting stamp. Such a stamp shall have several angular positions for the peripheral radial extensions in relation to the holes for the studs 44 of the outer rotor core.

Figure 13:
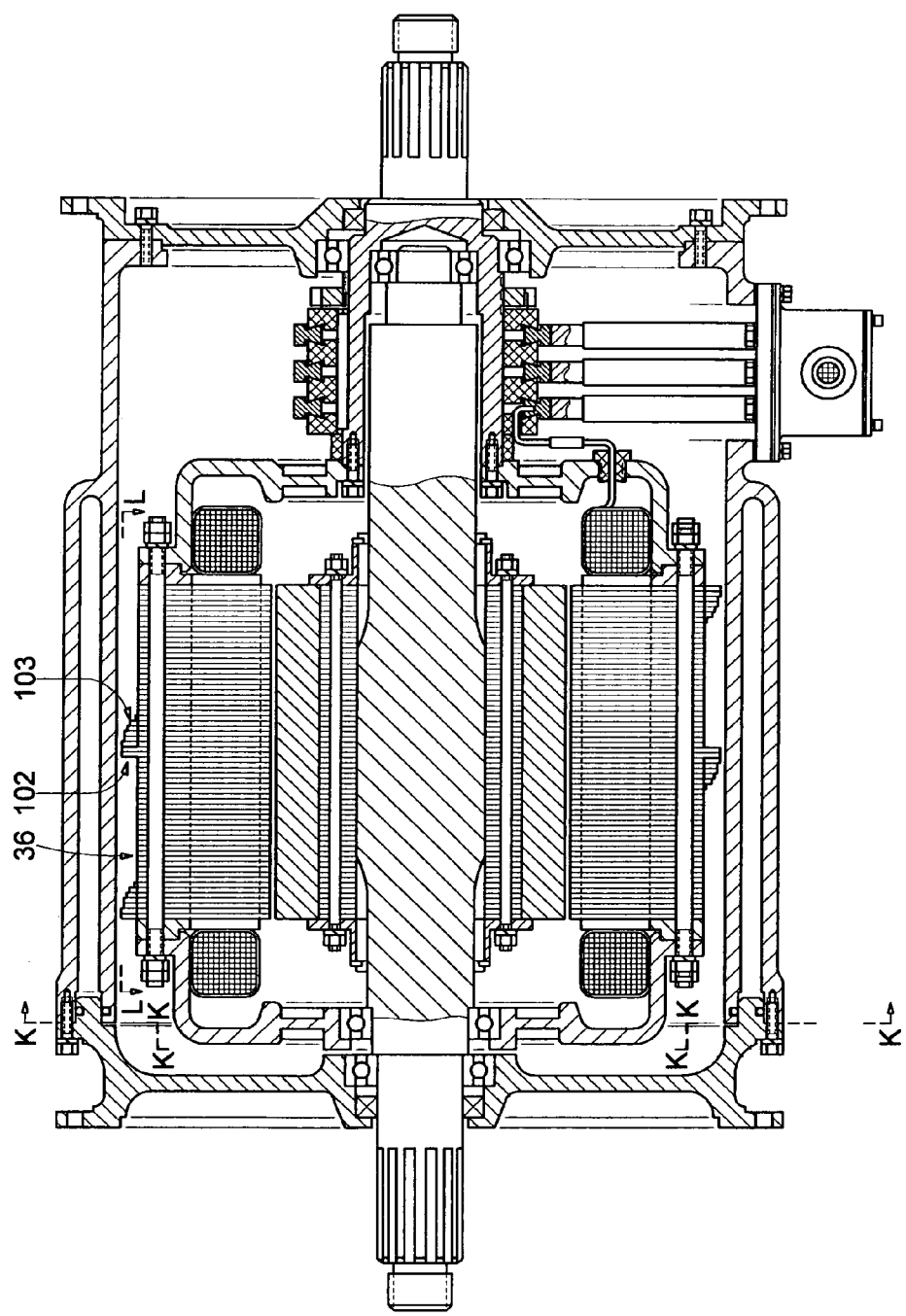
FIG. 13 is a schematic central longitudinal sectional view of a fourth embodiment of a dual-rotor motor according to this invention.
Figure 14:
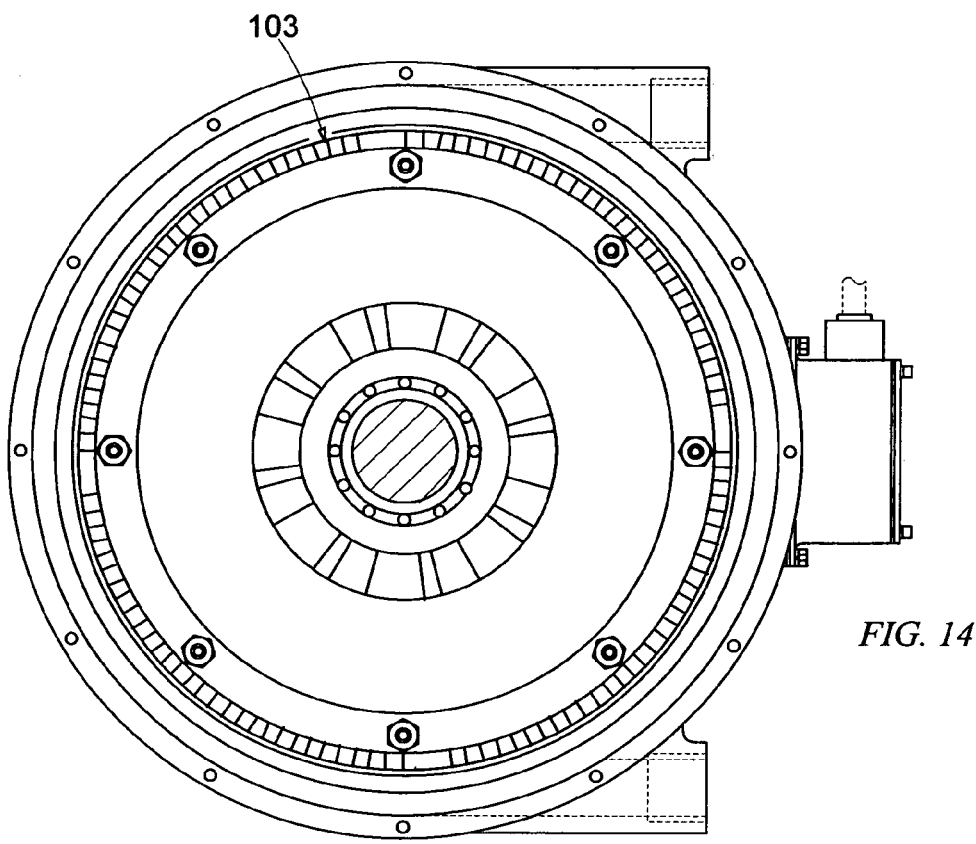
FIG. 14 is a sectional view K-K from FIG. 13.
Figure 15:
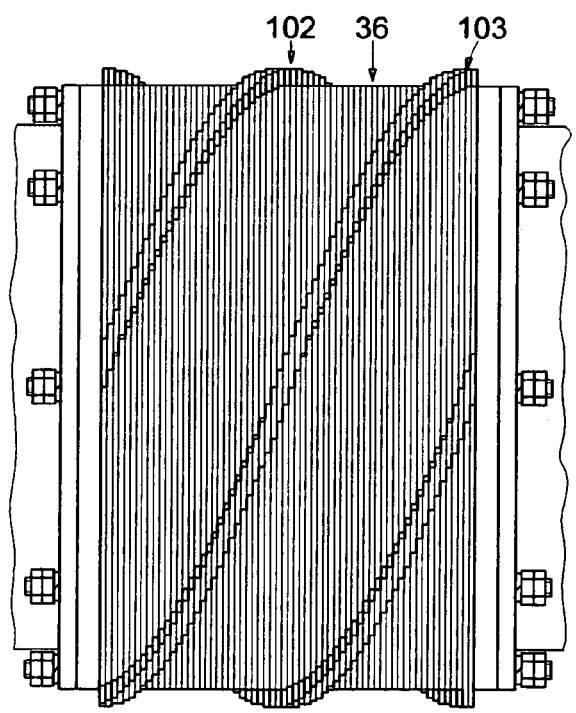
FIG. 15 is a partial sectional view L-L from FIG. 13.

Referring to FIG. 13, FIG. 14, and FIG. 15, which illustrate a fourth embodiment of this invention, a peripheral axial fan 102, having four long spiral blades 103, is integrated with the outer rotor core 36. The sectional view in FIG. 14 has been rotated in the plane of the drawing 90° counter-clockwise for showing the motor in its natural position. This peripheral axial fan 102 is arranged in the same way, uses the same means, and operates in the same way as the peripheral axial fan 99 described with the third embodiment (FIG. 10 to FIG. 12). The number of the blades 103 and their extension upon the length of the outer rotor core are the only differences between the third and the fourth illustrated embodiments in this specification. Therefore, this fourth embodiment is not further discussed. However, the specific number and length of the blades are the choice of the designer of the motor.

Figure 16:
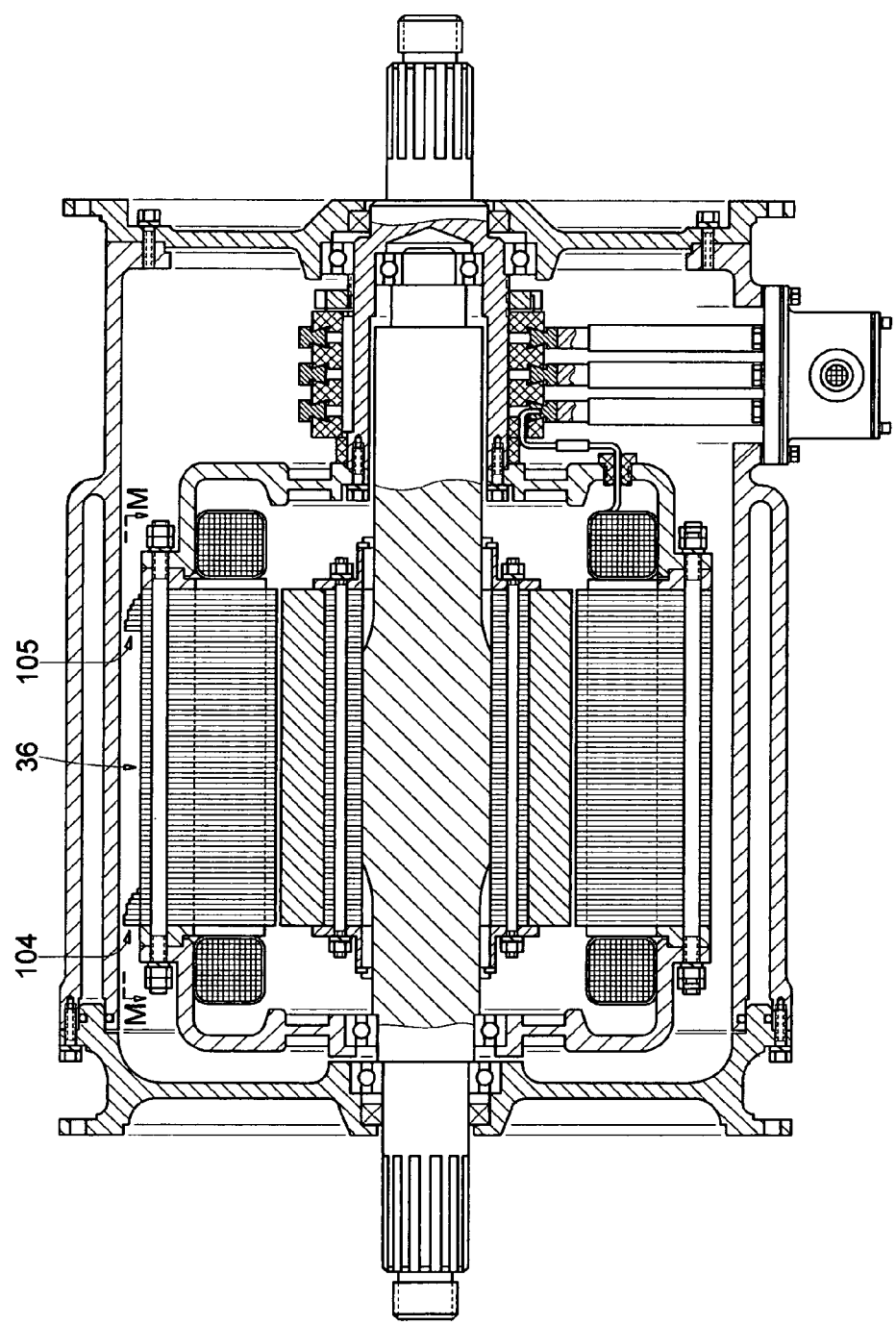
FIG. 16 is a schematic central longitudinal sectional view of a fifth embodiment of a dual-rotor motor according to this invention.
Figure 17:
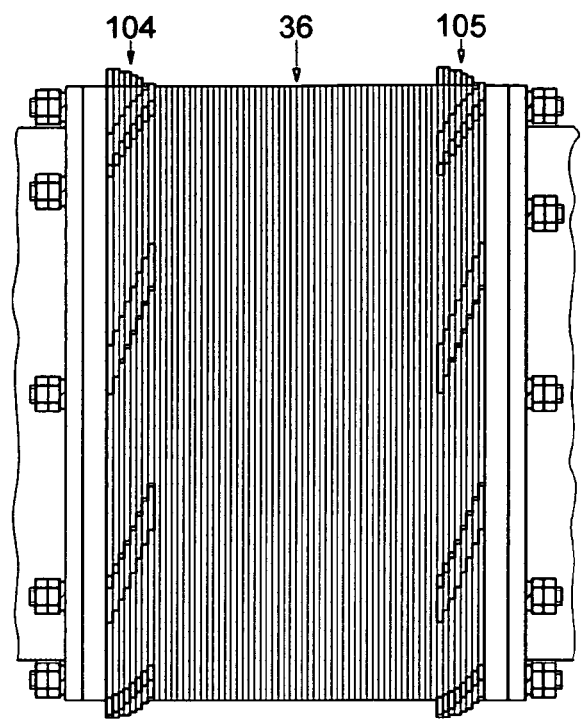
FIG. 17 is a partial sectional view M-M from FIG. 16.

Referring to FIG. 16 and FIG. 17, which illustrate a fifth embodiment of this invention, two axial peripheral fans 104, 105 are integrated with the outer rotor core 36, close to both ends of the outer rotor core respectively. These two peripheral axial fans are arranged in the same way, by the same means, and operate in the same way as the peripheral axial fan 99 described with the third embodiment (FIG. 10 to FIG. 12). The number of the peripheral fans integrated with the outer rotor core is the only difference between the third and this fifth illustrated embodiments. Therefore, the fifth embodiment is not further discussed.

Figure 19:
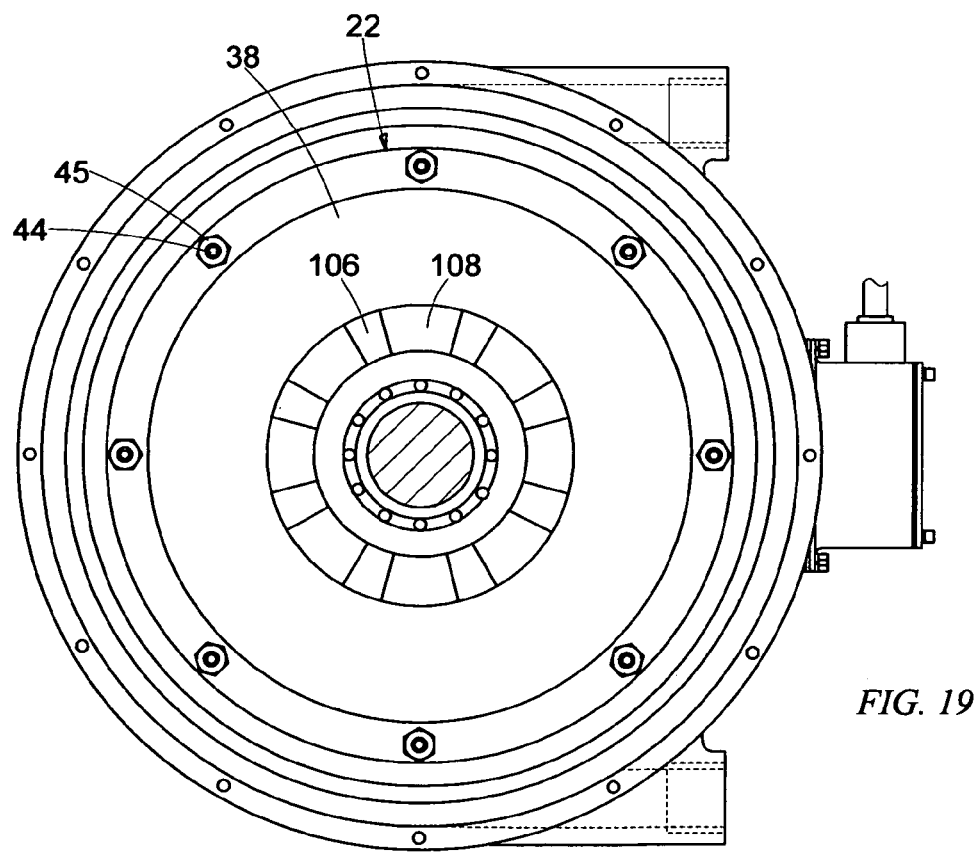
FIG. 19 is a sectional view N-N from FIG. 18.
Figure 18:
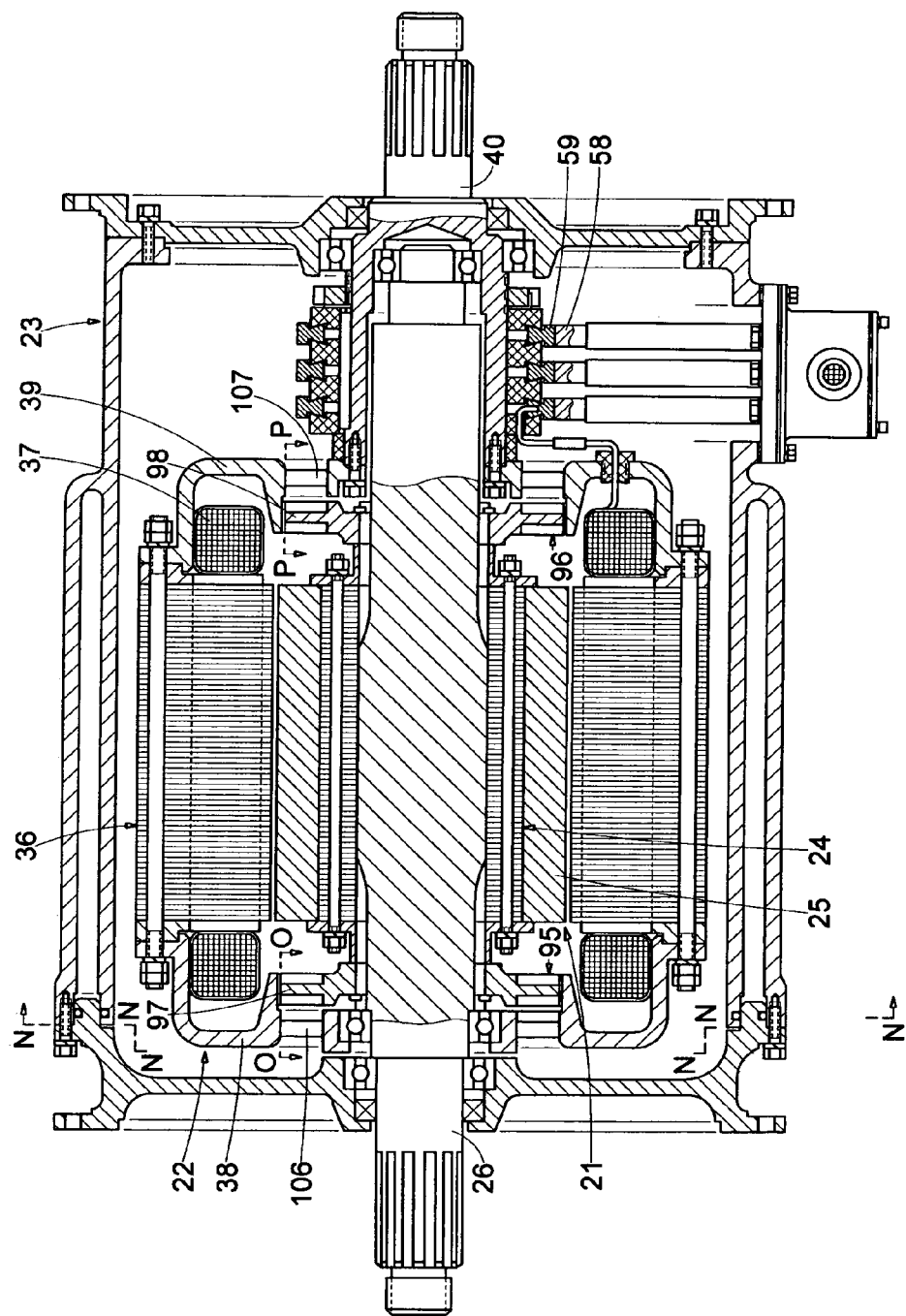
FIG. 18 is a schematic central longitudinal sectional view of a sixth embodiment of a dual-rotor motor according to this invention.
Figure 20:
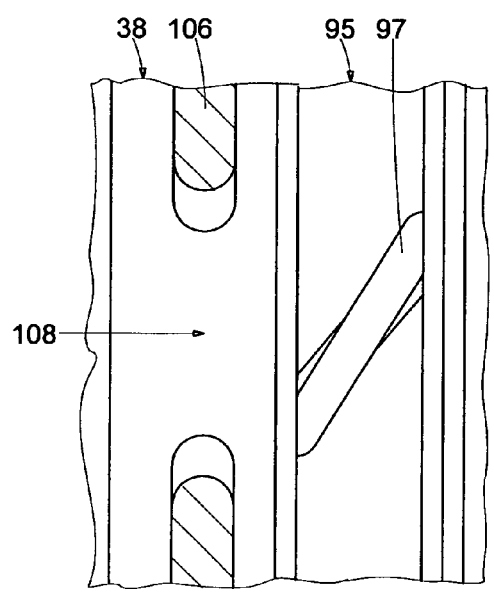
FIG. 20 is a partial sectional view O-O from FIG. 18, on a larger scale.
Figure 21:
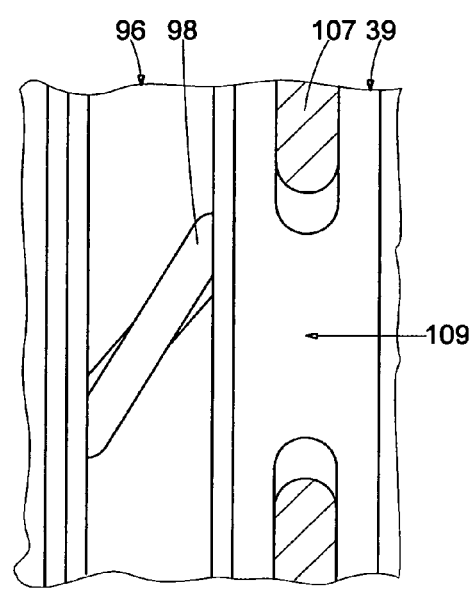
FIG. 21 is a partial sectional view P-P from FIG. 18, on a larger scale.

Referring from FIG. 18 to FIG. 21, which illustrate a sixth embodiment of this invention, instead of the blades (84, 85) of the outer rotor axial fans (82, 83) as described with the first embodiment (FIG. 1 and FIG. 3 to FIG. 5), here only a plurality of spokes 106, 107 connect the hubs of the two outer rotor side flanges 38, 39 with the rest of the outer rotor side flanges respectively. The openings 108, 109 between these spokes allow an internal close-loop air circulation between the two rotors, and between the outer rotor and the motor enclosure. In this embodiment, two inner rotor axial fans 95, 96 as described with the second embodiment (FIG. 7 to FIG. 9) produce the internal close-loop air circulation. The inner rotor axial fans rotate inside inner substantially cylindrical extensions of the outer rotor side flanges respectively. The sectional view in FIG. 19 has been rotated in the plane of the drawing 90° counter-clockwise for showing the motor in its natural position. In this embodiment, eight spokes 106 and eight openings 108 in the first outer rotor side flange 38 are shown in FIG. 19. It is assumed that the spokes 107 and openings 109 in the second outer rotor side flange 39 are arranged in the same way. FIG. 20 and FIG. 21, which are partial cylindrical sectional views O-O and P-P from FIG. 18 respectively, illustrate schematically the openings between the spokes of the flanges and the blades of the fans in a larger scale. The specific number and arrangement of the spokes and openings of the outer rotor side flanges, however, are choices of the designer of the dual-rotor motor. All other components and the operation of the dual-rotor motor according to this sixth embodiment are the same as described with the second embodiment.

It shall be emphasized that no matter how well the openings in the outer rotor side flanges are arranged, the rotation of the respective outer rotor side flange will always produce stronger resistance against the internal close-loop air circulation, than the resistance of an axial fan integrated within that flange. This will generate more heat, will reduce the mechanical efficiency of the cooling, and will reduce the rate of the heat transfer between the rotors and the motor enclosure. Therefore, embodiments without outer rotor axial fans, though possible, will be inferior to the first preferred embodiment with the two outer rotor axial fans, as well as to the second preferred embodiment with two outer rotor axial fans and two inner rotor axial fans.

Embodiments including only one of the inner rotor axial fans, but without any of the outer rotor axial fans 82, 83 are also possible. Such arrangements, however, will require some openings in both outer rotor side flanges for allowing the described close-loop air circulation. No matter how well these openings are arranged, the rotation of the outer rotor side flanges will always produce stronger resistance against the internal close-loop air circulation, than the resistance of axial fans integrated within the flanges. This will generate more heat, will reduce the mechanical efficiency of the cooling, and will reduce the rate of the heat transfer between the rotors and the motor enclosure. Therefore, such embodiments, though possible, will be inferior to the first and to the second preferred embodiments. For that reason, such embodiments without outer rotor axial fans are not shown and further described.

Several other possible embodiments of a dual-rotor motor according to this invention are briefly described herein after, without specific illustrative drawings.

Embodiments including only one of the outer rotor axial fans 82, 83 described with the first embodiment, or one of the outer rotor axial fans and one of the inner rotor axial fans 95, 96 described with the second embodiment are also possible. Such arrangements, however, will require some openings in the outer rotor side flange, which is without an integrated axial fan, for allowing the described close loop air circulation. No matter how well these openings are arranged, the rotation of the respective outer rotor side flange will always produce stronger resistance against the internal air circulation, than the resistance of an axial fan integrated within that flange. This will generate more heat, will reduce the mechanical efficiency of the cooling, and will reduce the rate of the heath transfer between the rotors and the motor enclosure. Therefore, such embodiments, though possible, will be inferior to the first preferred embodiment with the two outer rotor axial fans, as well as to the second preferred embodiment with two outer rotor axial fans and two inner rotor axial fans. For that reason, embodiments with only one outer rotor axial fan are not shown and further described.

Embodiments including one or more peripheral axial fans, such as the peripheral axial fans described with the third, fourth, and fifth embodiments respectively, but without any of the outer rotor axial fans 82, 83 are possible. Such arrangements, however, will require some openings in both outer rotor side flanges for allowing the described close-loop air circulation. No matter how well these openings are arrange, the rotation of the outer rotor side flanges will always produce stronger resistance against the internal air circulation, than the resistance of axial fans integrated within the flanges. This will generate more heat, will reduce the mechanical efficiency of the cooling, and will reduce the rate of the heath transfer between the rotors and the motor enclosure. Therefore, such embodiments, though possible, will be inferior to the third, fourth, or fifth embodiment respectively. For that reason, such embodiments without outer rotor axial fans are not shown and further described.

An embodiment including a centrifugal fan coupled with the inner rotor shaft 26, and located between the first outer rotor side flange 38 and the first motor enclosure side flange 50, but without any axial fans, is also possible. Such arrangement, however, will require some openings in both outer rotor side flanges for allowing the described close-loop air circulation, and will suffer from excessive resistance against the internal air circulation as described above in the previous several paragraphs. Therefore, such embodiment, though possible, will be inferior to the first and second embodiments, described in this specification. For that reason, an embodiment with one centrifugal fan coupled with the inner rotor shaft, is not shown and further discussed.

It shall be understood, however, that all possible combinations of the described fans and all possible modifications of their details within the construction of a dual-rotor electric traction motor will present just other embodiments of such a motor according to the present invention.

Figure 22:
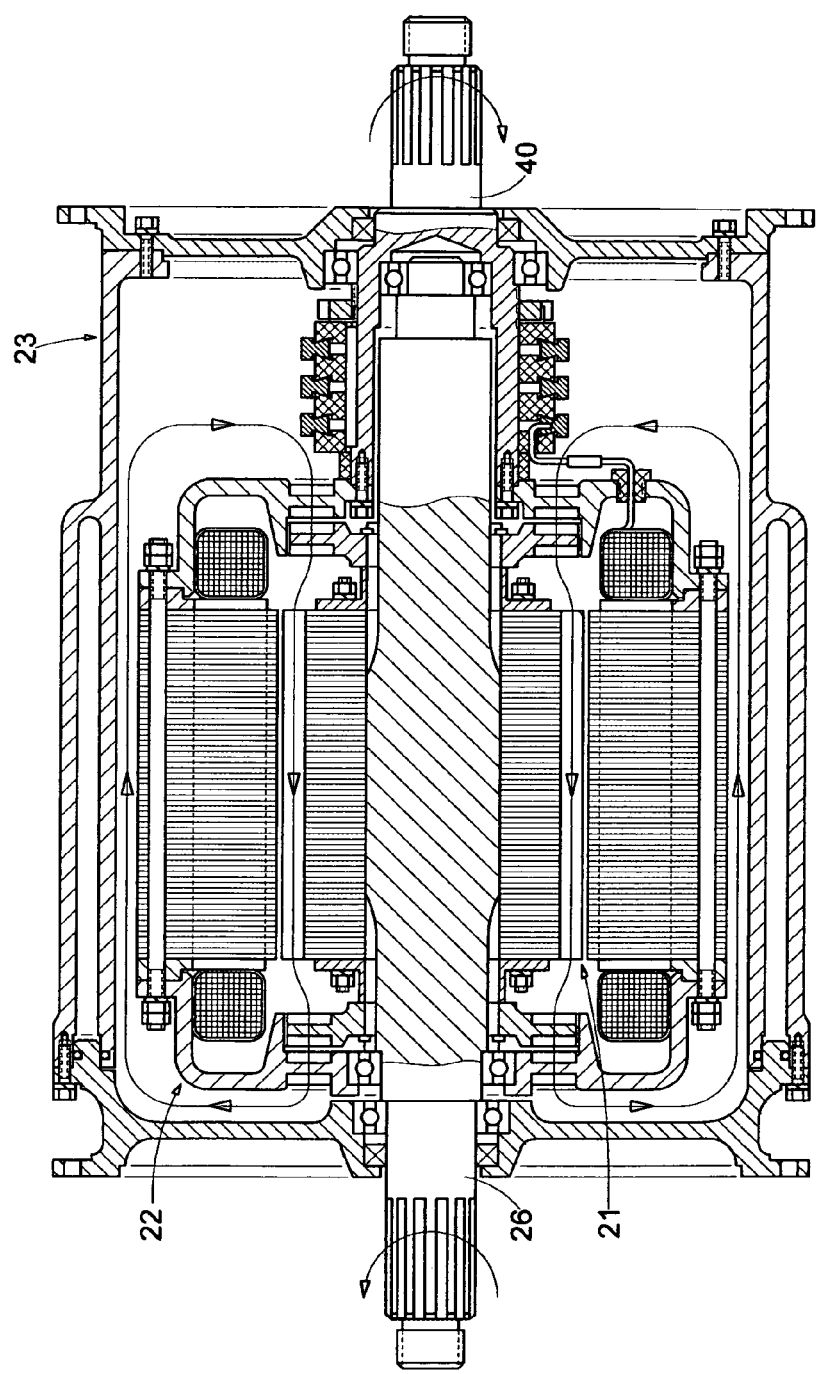
FIG. 22 illustrates schematically the opposite directions of rotation of the two rotors and the corresponding continuous internal close-loop air circulation within the dual-rotor motor, in a central longitudinal sectional view of the second embodiment of the dual-rotor motor according to this invention.
Figure 23:
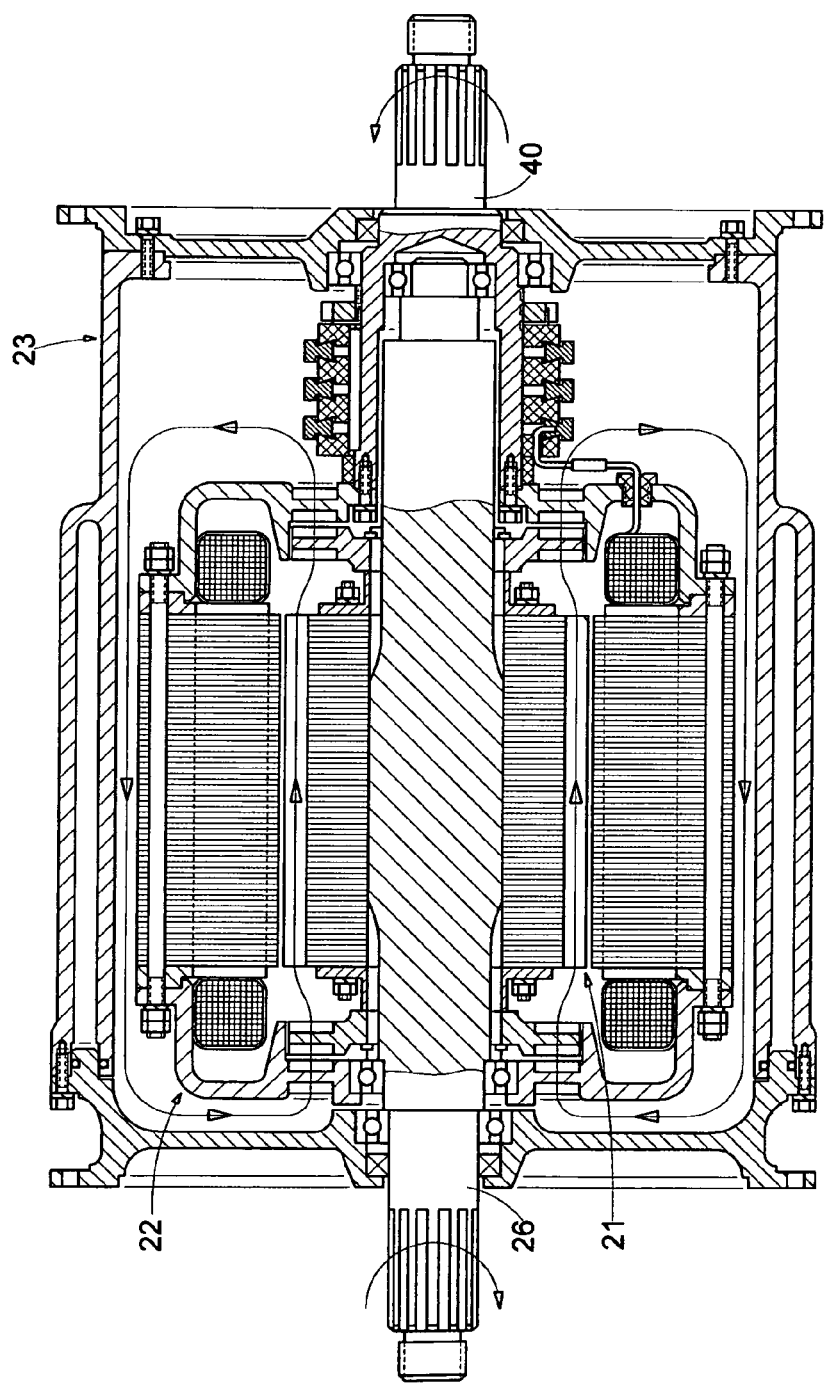
FIG. 23 illustrates schematically the reverse opposite directions of rotation of the two rotors, in comparison with the opposite directions of rotation of the rotors illustrated in FIG. 22, and the corresponding continuous internal close-loop air circulation within the dual-rotor motor, in a central longitudinal sectional view of the second embodiment of the dual-rotor motor according to this invention.

FIG. 22 and FIG. 23 are schematic central longitudinal sectional views of the dual-rotor motor, in which sectional views the opposite directions of rotations of both rotors of the dual-rotor motor, as well as the continuous internal close-loop air circulation within the dual-rotor motor, discussed earlier in this specification, are illustrated schematically. For simplicity and clarity of the drawings, the sectional views shown in these two figures are in a longitudinal central plain crossing between the permanent magnets of the inner rotor, wherein the brushes and details related to them do not show. The direction of rotation of each rotor is illustrated by an arrow-headed semi-circular line around the shaft of the respective rotor and is hereinafter described as if observed from the left side of the drawing. The continuous internal close-loop air circulation between both rotors and between the outer rotor and the motor enclosure is illustrated via two close-loop lines with arrows, which close-loop lines are symmetrical to the axis of rotation of the rotors. The arrows of these close-loop lines illustrate the general directions of the air flow within the dual-rotor motor, on the assumption that the attack angles of the blades of the fans are as shown in the respective figures described earlier in this specification. It shall be understood that the close-loop lines, illustrating the internal close-loop air circulation in any central longitudinal sectional view of the dual-rotor motor will be substantially the same as the close-loop lines shown in FIG. 22 and FIG. 23.

As it was mentioned earlier in this specification, the axial motion of the air, produced by the rotation of the fans, and the rotational motion of the air, produced by the rotation of the rotors, combine in a complicated spiral-like turbulent internal air circulation. Nevertheless, this complicated spiral-like air circulation will generally follow the close-loop lines shown in FIG. 22 or FIG. 23, depending on the opposite directions of rotation of the rotors. Although the second embodiment of the dual-rotor motor is shown in these two figures, it shall be understood that this is only for purpose of illustration, and that the internal close-loop air circulation in all but one of the described in this specification embodiments of the dual-rotor motor will be substantially the same as the internal close-loop air circulation shown and described here in FIG. 22 or FIG. 23, depending on the opposite directions of rotations of the rotors. The exception is the briefly described embodiment that includes only one centrifugal fan coupled with the inner rotor shaft, wherein the internal close-loop air circulation will be as shown and described in FIG. 22, regardless of the opposite directions of rotation of the rotors.

In FIG. 22 the inner rotor 21 rotates counter-clockwise and the outer rotor 22 rotates clockwise. The air flows between the inner and outer rotors in a right-to-left direction, then between the outer rotor and the motor enclosure in an outward radial (centrifugal) direction, then between the outer rotor and the motor enclosure in a left-to-right direction, and then between the outer rotor and the motor enclosure in an inward radial (centripetal) direction, following the close-loop lines.

In FIG. 23 the inner rotor 21 rotates clockwise and the outer rotor 22 rotates counter-clockwise. The air flows between the inner and outer rotors in a left-to-right direction, then between the outer rotor and the motor enclosure in an outward radial (centrifugal) direction, then between the outer rotor and the motor enclosure in a right-to-left direction, and then between the outer rotor and the motor enclosure in an inward radial (centripetal) direction, following the close-loop lines. It is obvious that in FIG. 23 the rotations of the rotors and the internal close-loop air circulation are in reverse directions to those in FIG. 22.

It shall be understood also that the scope of this invention extends to any dual-rotor electric traction motor according to the above description and the following claims, regardless of the specific application of the motor and regardless of the specific source of electric energy that powers the motor.

What is claimed is:

1. An electric traction motor comprising:
   an outer rotor arranged as a motor armature, said outer rotor including a hollow substantially cylindrical laminated armature core, a plurality of armature windings imbedded in a plurality of parallel inside slots of said armature core respectively for producing a revolving magnetic field, a first outer rotor side flange and a second outer rotor side flange attached coaxially to both sides of said armature core respectively and firmly tightened together with the armature core, and an outer rotor shaft firmly attached coaxially to said second outer rotor side flange and extending outside the second outer rotor side flange;
   an inner rotor arranged as a motor field, said inner rotor including a substantially cylindrical field core, a plurality of permanent magnets imbedded in a plurality of parallel outside slots of said field core respectively for producing a permanent magnetic field, and an inner rotor shaft coupled with the field core, rotatably supported coaxially inside the outer rotor, and extending outside said first outer rotor side flange;
   a stationary motor enclosure, including a central substantially cylindrical motor enclosure, a first motor enclosure side flange and a second motor enclosure side flange firmly attached to both sides of said central cylindrical motor enclosure respectively, wherein said inner rotor shaft is rotatably supported in said first motor enclosure side flange coaxially to the central cylindrical motor enclosure and said outer rotor shaft is rotatably supported in said second motor enclosure side flange coaxially to the central cylindrical enclosure;
   an electric motor controller for operating said electric traction motor, including control of the direction and magnitude of the electric current through the windings of said motor armature, wherein said motor controller is arranged to produce via the motor armature an electromagnetic field revolving in relation to said outer rotor, and wherein the interaction between said revolving electromagnetic field of the outer rotor and said permanent magnetic field of said inner rotor propels said two rotors to rotate in opposite directions, and a first outer rotor axial fan integrated within the first outer rotor side flange and a second outer rotor axial fan integrated within the second outer rotor side flange, said two outer rotor axial fans operating in series and producing a continuous internal close-loop air circulation between the inner and outer rotors and between the outer rotor and said motor enclosure, for improving the rate of heat transmission from both rotors to the motor enclosure when the outer rotor rotates.

2. An electric traction motor according to claim 1, wherein said motor armature and motor controller are further arranged to selectively operate said dual-rotor motor as a dual-rotor electric braking generator for converting part of the kinetic energy of the vehicle driven by said electric traction motor into electric energy during speed retardation or braking of the vehicle.

3. An electric traction motor according to claim 1, wherein said motor controller is further arranged in response to an external control command to pre-select the direction of rotation of said revolving electromagnetic field, and in response to a variable external control command to vary the magnitude of the electric current through said windings of said motor armature, for pre-selecting said opposite directions of rotation of both rotors and for controlling continuously variable torque-speed output of said electric traction motor, respectively.

4. An electric traction motor according to claim 1, wherein said armature and said motor controller are arranged to operate said electric traction motor as a three-phase alternating-current synchronous electrical machine.

5. An electric traction motor according to claim 1, wherein electric current is conducted from a plurality of stationary electric terminals to said plurality of rotating armature windings via sliding contacts of a plurality of brushes and sliprings respectively, and wherein each of said brushes is arranged in a brush-holder, and wherein said terminals and brush-holders are firmly attached to a terminals/brush-holders support, and wherein said terminals/brush-holders support is firmly attached to and removable from said motor enclosure together with said attached to the terminals/brush-holders support terminals and brush holders.

6. An electric traction motor according to claim 1, wherein each of said two outer rotor axial fans integrated within said outer rotor side flanges respectively includes a plurality of radial blades evenly spread out and connecting an inner substantially cylindrical surface of the outer rotor axial fan with an outer substantially cylindrical surface of the outer rotor axial fan, wherein said substantially cylindrical surfaces and said blades are inseparable parts of the respective outer rotor side flange, and wherein the attack angles of the blades of both outer rotor axial fans are in the same direction in relation to the directions of rotation.

7. An electric traction motor according to claim 1, and further comprising a first inner rotor axial fan coupled with said inner rotor shaft inside said outer rotor and positioned within an inner substantially cylindrical extension of said first outer rotor side flange, and a second inner rotor axial fan coupled with the inner rotor shaft inside the outer rotor and positioned within an inner substantially cylindrical extension of said second outer rotor side flange, wherein said two inner rotor axial fans are working in series with said two outer rotor axial fans for improving said internal close-loop air circulation when both rotors rotate, and for producing the internal close-loop air circulation when the outer rotor is selectively immobilized and only the inner rotor rotates.

8. An electric traction motor according to claim 1, and further comprising at least one peripheral axial fan integrated with said laminated armature core and arranged between the armature core and the inner cylindrical surface of said cylindrical motor enclosure, wherein said peripheral axial fan works in series with said two outer rotor axial fans for improving said internal close-loop air circulation when said outer rotor rotates.

9. An electric traction motor according to claim 1, and further comprising an external liquid-cooling system for dissipating the heat from said motor enclosure to the environment.

10. An electric traction motor according to claim 1, and further comprising an external air-cooling system for dissipating the heat from said motor enclosure to the environment.

11. An electric traction motor according to claim 1, and further comprising means allowing firm attachment of said motor enclosure to a support of said electric traction motor.

12. An electric traction motor according to claim 1, and further comprising means allowing firm attachment of stationary components of drive trains, powered by said electric traction motor, to said motor enclosure.

13. An electric traction motor according to claim 1, wherein said two outer rotor axial fans are identical.

14. An electric traction motor according to claim 5, wherein said plurality of sliprings, together with at least one slipring conductor soldered to one slipring, are insulated from each other, mounted onto said outer rotor shaft, and insulated from the outer rotor shaft via a plurality of insulator-rings coupled with the outer rotor shaft, and wherein exit ends of said slipring conductors pass through axial holes in said insulator-rings respectively and are bent radially outwards in a plane substantially perpendicular to the axis of rotation, and wherein the slipring conductors are soldered to respective leads of said armature windings extending outside said second outer rotor side flange through insulator-bushings respectively and bent radially inward in said substantially perpendicular to the axis of rotation plane, in line with the ends of the slipring conductors respectively.

15. An electric traction motor according to claim 7, wherein said two inner rotor axial fans are identical.

16. An electric traction motor according to claim 7, wherein each of said inner rotor axial fans includes a plurality of radial blades evenly spread out from a hub of the axial fan to a circumference close to said substantially cylindrical extension of the respective outer rotor side flange, and wherein the attack angles of said radial blades of both inner rotor axial fans are in the same direction in relation to the directions of rotation of the inner rotor, but are in opposite direction in relation to the direction of the attack angle of the blades of said outer rotor axial fans, for producing air flow in the same direction as that of the air flow produced by the outer rotor axial fans at the opposite directions of rotation of both rotors.

17. An electric traction motor according to claim 8, wherein said peripheral axial fan includes a plurality of radial blades evenly spread out upon the outer cylindrical surface of said laminated armature core, and wherein said radial blades of the peripheral fan are made of a plurality of identical radial extensions on a plurality of consecutive lamellas of the armature core, said identical radial extensions of each consecutive lamella partially overlapping the radial extensions of the previous lamella by means of an equal angular displacement in the same direction of the radial extensions of each consecutive lamella, respectively.

18. An electric traction motor according to claim 17, wherein the direction of the attack angle of said blades of said peripheral axial fan in relation to the direction of rotation is opposite to the direction of the attack angle of said blades of said outer rotor axial fans, for producing air flow between said armature core and said cylindrical motor enclosure in an opposite axial direction to the axial direction of the air flow between said inner and outer rotors produced by said outer rotor axial fans.

19. An electric traction motor comprising:

an outer rotor arranged as a motor armature, said outer rotor including a hollow substantially cylindrical laminated armature core, a plurality of armature windings imbedded in a plurality of parallel inside slots of said armature core respectively for producing a revolving magnetic field, a first outer rotor side flange and a second outer rotor side flange attached coaxially to both sides of said armature core respectively and firmly tightened together with the armature core, and an outer rotor shaft firmly attached coaxially to said second outer rotor side flange and extending outside the second outer rotor side flange;

an inner rotor arranged as a motor field, said inner rotor including a substantially cylindrical field core, a plurality of permanent magnets imbedded in a plurality of parallel outside slots of said field core respectively for producing a permanent magnetic field, and an inner rotor shaft coupled with the field core, rotatably supported coaxially inside the outer rotor, and extending outside said first outer rotor side flange;

a stationary motor enclosure including a central substantially cylindrical motor enclosure, a first motor enclosure side flange and a second motor enclosure side flange firmly attached to both sides of said central cylindrical motor enclosure respectively, wherein said inner rotor shaft is rotatably supported in said first motor enclosure side flange coaxially to the central cylindrical motor enclosure and said outer rotor shaft is rotatably supported in said second motor enclosure side flange coaxially to the central cylindrical enclosure;

an electric motor controller for operating said electric traction motor including control of the direction and magnitude of the electric current through the windings of said motor armature, wherein said motor controller is arranged to produce via the motor armature an electromagnetic field revolving in relation to said outer rotor, and wherein the interaction between said revolving electromagnetic field of the outer rotor and said permanent magnetic field of said inner rotor propels said two rotors to rotate in opposite directions;

a plurality of openings in each of said two outer rotor side flanges for allowing an internal close-loop air circulation between the two rotors and between the outer rotor and said motor enclosure, and a first inner rotor axial fan coupled with said inner rotor shaft inside said outer rotor and positioned within an inner substantially cylindrical extension of the first outer rotor side flange, and a second inner rotor axial fan coupled with the inner rotor shaft and positioned within an inner substantially cylindrical extension of the second outer rotor side flange, said two inner rotor axial fans producing an internal close-loop air circulation between both rotors and between the outer rotor and said motor enclosure, for improving the rate of heat transmission between the rotors and the motor enclosure when the inner rotor rotates.

20. An electric traction motor comprising:

an outer rotor arranged as a motor armature, said outer rotor including a hollow substantially cylindrical laminated armature core, a plurality of armature windings imbedded in a plurality of parallel inside slots of said armature core respectively for producing a revolving magnetic field, a first outer rotor side flange and a second outer rotor side flange attached coaxially to both sides of said armature core respectively and firmly tightened together with the armature core, and an outer rotor shaft firmly attached coaxially to said second outer rotor side flange and extending outside the second outer rotor side flange;

an inner rotor arranged as a motor field, said inner rotor including a substantially cylindrical field core, a plurality of permanent magnets imbedded in a plurality of parallel outside slots of said field core respectively for producing a permanent magnetic field, and an inner rotor shaft coupled with the field core, rotatably supported coaxially inside the outer rotor, and extending outside said first outer rotor side flange;

a stationary motor enclosure, including a central substantially cylindrical motor enclosure, a first motor enclosure side flange and a second motor enclosure side flange firmly attached to both sides of said central cylindrical motor enclosure respectively, wherein said inner rotor shaft is rotatably supported in said first motor enclosure side flange coaxially to the central cylindrical motor enclosure and said outer rotor shaft is rotatably supported in said second motor enclosure side flange coaxially to the central cylindrical enclosure;

an electric motor controller for operating said electric traction motor including control of the direction and magnitude of the electric current through the windings of said motor armature, wherein said motor controller is arranged to produce via the motor armature an electromagnetic field revolving in relation to said outer rotor, and wherein the interaction between said revolving electromagnetic field of the outer rotor and said permanent magnetic field of said inner rotor propels said two rotors to rotate in opposite directions;

a plurality of openings in each of said two outer rotor side flanges for allowing an internal close-loop air circulation between the two rotors and between the outer rotor and said motor enclosure, and an inner rotor axial fan coupled with said inner rotor shaft inside said outer rotor and positioned within an inner substantially cylindrical extension of one of said outer rotor side flanges, said inner rotor axial fan producing an internal close-loop air circulation between both rotors and between the outer rotor and said motor enclosure, for improving the rate of heat transmission between the rotors and the motor enclosure when the inner rotor rotates.

\* \* \* \* \*